US012804134B2

(12) United States Patent
Zhu et al.

(10) Patent No.: US 12,804,134 B2
(45) Date of Patent: Nov. 17, 2026

(54) DATA PROCESSING METHOD FOR IMMERSIVE MEDIA, APPARATUS, DEVICE, MEDIUM, AND PRODUCT

(71) Applicant: Tencent Technology (Shenzhen) Company Limited, Shenzhen (CN)

(72) Inventors: Wenjie Zhu, Shenzhen (CN); Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/990,067

(22) Filed: Dec. 20, 2024

(65) Prior Publication Data

US 2025/0126243 A1 Apr. 17, 2025

Related U.S. Application Data

(63) Continuation of application No. PCT/CN2023/098811, filed on Jun. 7, 2023.

(30) Foreign Application Priority Data

Aug. 18, 2022 (CN) ......................... 202210995023.5

(51) Int. Cl.
*H04N 19/105* (2014.01)
*H04N 19/159* (2014.01)
*H04N 19/184* (2014.01)

(52) U.S. Cl.
CPC ......... *H04N 19/105* (2014.11); *H04N 19/159* (2014.11); *H04N 19/184* (2014.11)

(58) Field of Classification Search
CPC ............... H04N 19/105; H04N 19/159; H04N 19/184; H04N 19/597; H04N 19/70;
(Continued)

(56) References Cited

U.S. PATENT DOCUMENTS

2021/0029187 A1* 1/2021 Oh .......................... G06T 17/10
2022/0108479 A1* 4/2022 Ray ......................... G06T 17/00

FOREIGN PATENT DOCUMENTS

CN 113852829 A 12/2021
CN 113992635 A * 1/2022 ........... H04N 19/105
(Continued)

OTHER PUBLICATIONS

International Search Report of PCT/CN2023/098811 dated Sep. 28, 2023 [PCT/ISA/210].
(Continued)

*Primary Examiner* — Masum Billah
(74) *Attorney, Agent, or Firm* — Sughrue Mion, PLLC

(57) ABSTRACT

A data processing method for immersive media, performed by a content consumption device, includes: acquiring a point cloud stream including attribute data groups, including: a target attribute data group that is a to-be-decoded attribute data group, and one or more to-be-referenced attribute data groups that relate an attribute prediction relationship mode to the target attribute data group; obtaining the attribute prediction relationship mode based on a group identifier of the target attribute data group; determining a reference attribute data group corresponding to the target attribute data group based on prediction states of the target attribute data group for the to-be-referenced attribute data groups being a first state; and decoding the target attribute data group, wherein the reference attribute data group includes a configuration from among configurations for participating in decoding the target attribute data group and for not participating in decoding the target attribute data group.

20 Claims, 7 Drawing Sheets

(58) Field of Classification Search
CPC .... H04N 13/161; H04N 13/282; H04N 19/42; H04N 19/91
USPC .......................................................... 375/240
See application file for complete search history.

(56) References Cited

FOREIGN PATENT DOCUMENTS

| | | | |
|---|---|---|---|
| CN | 114793484 | A | 7/2022 |
| CN | 115396645 | A | 11/2022 |
| KR | 10-2021-0004885 | A | 1/2021 |
| WO | 2022/062860 | A1 | 3/2022 |

OTHER PUBLICATIONS

Written Opinion of PCT/CN2023/098811dated Sep. 28, 2023 [PCT/ISA/237].

EP Search Report Issued Mar. 31, 2026 in EP Application No. 23854043.9.

"Text of ISO/IEC 23090-9 DIS Geometry-based PCC", 129. MPEG Meeting; Jan. 13, 2020-Jan. 17, 2020; Brussels; (Motion Picture Expert Group or ISO/IEC JTC1/SC29/WG11), Apr. 20, 2020 (127 pages).

* cited by examiner

DATA PROCESSING METHOD FOR IMMERSIVE MEDIA, APPARATUS, DEVICE, MEDIUM, AND PRODUCT

CROSS-REFERENCE TO RELATED APPLICATIONS

This application is a continuation application of International Application No. PCT/CN2023/098811 filed on Jun. 7, 2023, which claims priority to Chinese Patent Application No. 202210995023.5, filed with the China National Intellectual Property Administration on Aug. 18, 2022, the disclosures of each being incorporated by reference herein in their entireties.

FIELD

The disclosure relates to the field of computer technologies, and in particular, to data processing for immersive media.

BACKGROUND

Immersive media is media content that can bring immersive experience to a service object, and point cloud media is immersive media. In a related technology, there are a plurality of attribute types, and each attribute type has a point cloud stream of a plurality of attribute data groups (or referred to as a multi-attribute point cloud stream). When there is an association relationship between these attribute data groups, a correlation indication mode may be applicable to a situation in which there is one attribute data group for each attribute type. A prediction reference relationship between a plurality of attribute data groups cannot be clearly indicated. This affects decoding efficiency of the multi-attribute point cloud stream.

SUMMARY

Provided are a data processing method for immersive media, an apparatus, a device, a storage medium, and a program product, capable of defining a prediction reference relationship between a plurality of attribute data groups, and realizing attribute prediction between the plurality of attribute data groups.

According to some embodiments, a data processing method for immersive media, performed by a content consumption device, includes: acquiring a point cloud stream including a plurality of attribute data groups, including: a target attribute data group that is a to-be-decoded attribute data group, and one or more to-be-referenced attribute data groups that relate an attribute prediction relationship mode to the target attribute data group; obtaining the attribute prediction relationship mode based on a group identifier of the target attribute data group; determining a reference attribute data group corresponding to the target attribute data group based on one or more prediction states of the target attribute data group for the one or more to-be-referenced attribute data groups being a first state; and decoding the target attribute data group, wherein the reference attribute data group includes a third configuration from among a first configuration for participating in decoding the target attribute data group and a second configuration for not participating in decoding the target attribute data group.

According to some embodiments, a data processing apparatus for immersive media, includes: at least one memory configured to store computer program code; and at least one processor configured to read the program code and operate as instructed by the program code, the program code including: acquiring code configured to cause at least one of the at least one processor to acquire a point cloud stream including a plurality of attribute data groups, including: a target attribute data group that is a to-be-decoded attribute data group, and one or more to-be-referenced attribute data groups that relate an attribute prediction relationship mode to the target attribute data group; mode obtaining code configured to cause at least one of the at least one processor to: obtain the attribute prediction relationship mode based on a group identifier of the target attribute data group; reference determining code configured to cause at least one of the at least one processor to determine a reference attribute data group corresponding to the target attribute data group based on one or more prediction states of the target attribute data group for the one or more to-be-referenced attribute data groups being a first state; and first decoding code configured to cause at least one of the at least one processor to decode the target attribute data group, wherein the reference attribute data group includes a third configuration from among a first configuration for participating in decoding the target attribute data group and a second configuration for not participating in decoding the target attribute data group.

According to some embodiments, a non-transitory computer-readable storage medium, storing computer code which, when executed by at least one processor, causes the at least one processor to at least: acquire a point cloud stream including a plurality of attribute data groups, including: a target attribute data group that is a to-be-decoded attribute data group, and one or more to-be-referenced attribute data groups that relate an attribute prediction relationship mode to the target attribute data group; obtain the attribute prediction relationship mode based on a group identifier of the target attribute data group; determine a reference attribute data group corresponding to the target attribute data group based on one or more prediction states of the target attribute data group for the one or more to-be-referenced attribute data groups being a first state; and decode the target attribute data group, wherein the reference attribute data group include a third configuration from among a first configuration for participating in decoding the target attribute data group and a second configuration for not participating in decoding the target attribute data group . . .

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1A:
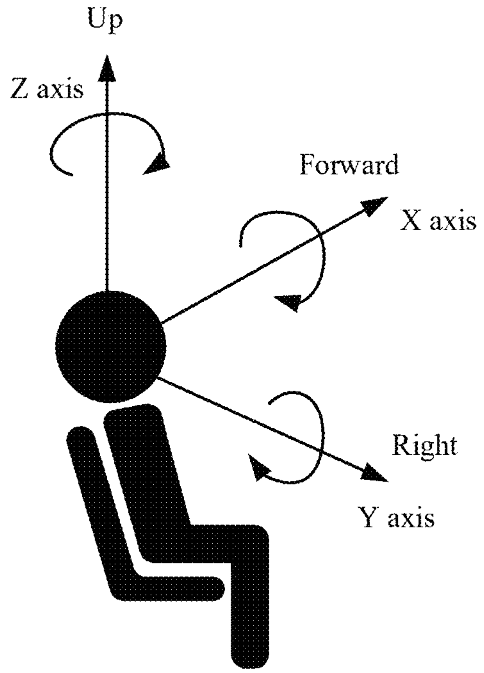
FIG. 1A is a schematic diagram of 3DoF according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

The technical solution of some embodiments is described in detail in the following.

1. Immersive media:

Immersive media relates to media files that can provide immersive media content, so that a service object immersed in the media content can obtain visual, auditory, and other sensory experience in the real world. The immersive media may be classified into 3DoF media, 3DoF+ media, and 6DoF media according to degrees of freedom (DoF) of service objects during consumption of the media content. Point cloud media is 6DoF media. In some embodiments, users (for example, viewers) who consume the immersive media (for example, the point cloud media) may be collectively referred to as service objects.

2. Point cloud:

A point cloud is a set of discrete points that are irregularly distributed in space and express a spatial structure and a surface attribute of a three-dimensional object or scene. Each point in the point cloud has at least three-dimensional location information, and may also have color, material, or other information depending on application scenarios. Each point in the point cloud may have a same quantity of additional attributes.

The point cloud may flexibly and conveniently express a spatial structure and a surface attribute of a three-dimensional object or scene, and therefore has widely applications, including a virtual reality (VR) game, computer aided design (CAD), a geographic information system (GIS), an automatic navigation system (ANS), digital cultural heritage, free-view broadcasting, three-dimensional immersion remote presentation, three-dimensional reconstruction of biological tissues and organs, and the like.

The point cloud may be obtained in the following ways: computer generation, 3-dimension (3D) laser scanning, 3D photogrammetry, and the like. A computer may generate a point cloud of a virtual three-dimension object and scene. 3D scanning may obtain a point cloud of a 3D object or scene in the static real world, and a million-level point cloud may be obtained every second. 3D photogrammetry may obtain a point cloud of a 3D object or scene in the dynamic real world, and a ten million-level point cloud may be obtained every second. In addition, in the medical field, a point cloud of a biological tissue and organ may be obtained through magnetic resonance imaging (MRI), computed tomography (CT), and electromagnetic positioning information. These technologies reduce costs and a time period for obtaining point cloud data and improve accuracy of data. With a change of a method for obtaining point cloud data, a large amount of point cloud data may be obtained. With continuous accumulation of large-scale point cloud data, efficient storage, transmission, release, sharing, and standardization of point cloud data have become the key to point cloud application.

3. Track (Track):

A track is a collection of media data in a process of encapsulating a media file. A media file may include one or more tracks. For example, a media file may include a video track, an audio track, and a caption track.

4. Sample (Sample):

A sample is an encapsulation unit in a process of encapsulating a media file. A track includes a plurality of samples. For example, a video track may include a plurality of samples, and a sample may be a video frame. In some embodiments, a sample may be a point cloud frame.

5. Degree of Freedom (DoF):

The DoF is a degree of freedom for a service object to move and generate content interaction when viewing immersive media (for example, point cloud media), and may include three degrees of freedom (3DoF), 3DoF+, and six degrees of freedom (6DoF). The 3DoF is three degrees of freedom of the head of the service object rotating around an x axis, a y axis and a z axis. The 3DoF+ is based on the three degrees of freedom, and the service object further has limited degrees of freedom to move along the x axis, the y axis and the z axis. The 6DoF is based on the three degrees of freedom, and the service object further has degrees of freedom to move freely along the x axis, the y axis and the z axis.

6. An international standard organization (ISO) standard-based media file format (ISOBMFF) is an encapsulation standard of a media file, and an ISOBMFF file is a moving picture experts group 4 (MP4) file.

7. Dynamic adaptive streaming over the hypertext transfer protocol (HTTP) (DASH) is an adaptive bit rate technology, and enables high-quality streaming media to be transmitted over the internet through traditional HTTP network servers.

8. Media presentation description signaling in DASH (MPD) describes media segment information in a media file.
9. A representation (Representation) is a combination of one or more media components in DASH. For example, a video file of a resolution may be regarded as a representation.
10. An adaptation set (Adaptation sets) is a collection of one or more video streams in DASH, and one adaptation set may include a plurality of representations.
11. A media segment (Media Segment) is a playable segment that conforms to a media format. When playing, the media segment may cooperate with previous 0 or more segments and an initialization segment (Initialization Segment).

Some embodiments relate to a data processing technology of immersive media. The following describes some concepts in the data processing of the immersive media. Some embodiments use an example in which the immersive media is point cloud media.

FIG. 1A is a schematic diagram of 3DoF according to some embodiments. As shown in FIG. 1A, the 3DoF means that a service object consuming immersive media is fixed at a center point of three-dimensional space, and the head of the service object rotates along an X axis, a Y axis and a Z axis to view pictures provided by media content.

Figure 1B:
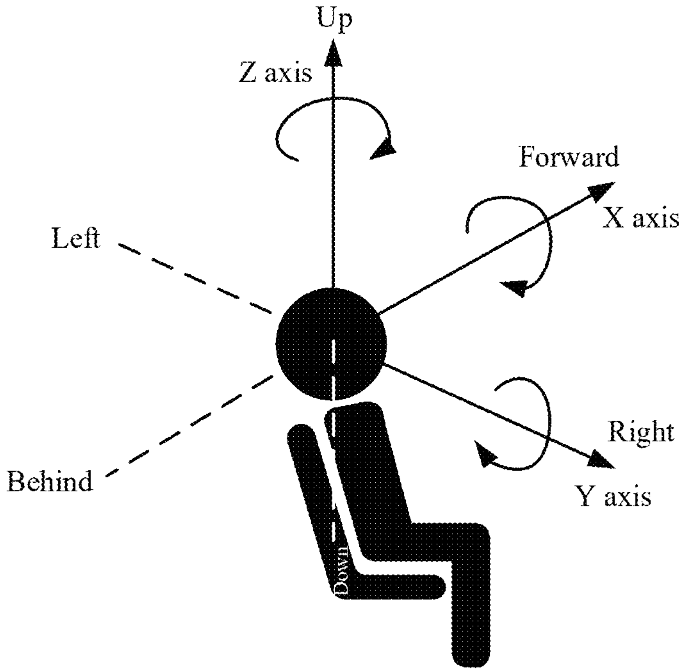
FIG. 1B is a schematic diagram of 3DoF+ according to some embodiments.

FIG. 1B is a schematic diagram of 3DoF+ according to some embodiments. As shown in FIG. 1B, the 3DoF+ means that when a virtual scene provided by immersive media has depth information, the head of the service object may move in limited space based on the 3DoF to view pictures provided by media content.

Figure 1C:
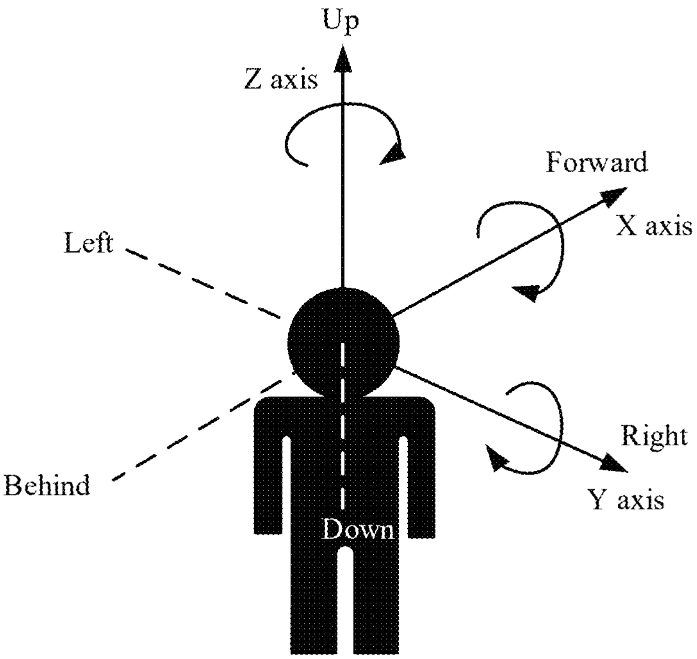
FIG. 1C is a schematic diagram of 6DoF according to some embodiments.

FIG. 1C is a schematic diagram of 6DoF according to some embodiments. As shown in FIG. 1C, the 6DoF is classified into window 6DoF, omnidirectional 6DoF, and 6DoF. The window 6DoF means that the service object is limited in rotation movements on the X axis and the Y axis, and translation on the Z axis. For example, the service object cannot see outside a window frame, and the service object cannot pass through a window. The omnidirectional 6DoF means that the service object is limited in rotation movements on the X axis, the Y axis, and the Z axis. For example, the service object cannot freely pass through three-dimensional 360-degree VR content in a limited movement area. The 6DoF means that the service object can freely translate along the X axis, the Y axis, and the Z axis based on the 3DoF. For example, the service object can freely move in the 3D 360-degree VR content.

Figure 2:
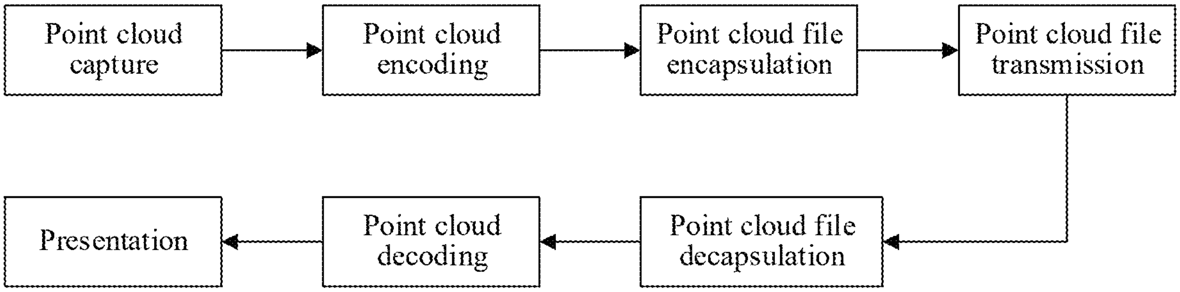
FIG. 2 is a schematic diagram of a process from collection to consumption of immersive media according to some embodiments.

FIG. 2 is a schematic diagram of a process from collection to consumption of immersive media according to some embodiments. As shown in FIG. 2, point cloud media is used as an example, and processing of the immersive media may include: point cloud collection, point cloud encoding, point cloud file encapsulation, point cloud file transmission, point cloud file decapsulation, point cloud decoding, and final video presentation.

Point cloud collection can convert point cloud data collected by a plurality of cameras at different angles into binary digital information. The binary digital information converted from the point cloud data is a binary data stream, and the binary digital information may also be referred to as a stream or a bit stream (Bitstream) of the point cloud data. Point cloud encoding means converting a file in an original video format into a file in another video format through a compression technology. From the perspective of how point cloud data is obtained, point cloud data may be divided into camera-captured point cloud data and computer-generated point cloud data. Because of different statistical characteristics, corresponding compression encoding methods may also be different. Compression encoding methods may include high efficiency video coding (HEVC/H.265), versatile video coding (VVC/H.266), an audio video coding standard (AVS), an audio video coding standard 3 (AVS3), and the like.

Based on point cloud encoding, an encoded data stream (for example, a point cloud stream) may be encapsulated and transmitted to a service object. Point cloud file encapsulation means storing the encoded and compressed point cloud stream in a file in a format according to an encapsulation format (or a container, or a file container). Encapsulation formats may include an audio video interleaved (AVI) format or an ISOBMFF format. In some embodiments, the point cloud stream is encapsulated in a file container in a file format such as ISOBMFF to form a point cloud file (or referred to as a media file, an encapsulated file, a video file), and the point cloud file may include a plurality of tracks, for example, a video track, an audio track, and a caption track.

Based on performing the encoding process and the file encapsulation process, a content production device may transmit the point cloud file to a client of a content consumption device, and the client may present final media content in the client end based on performing reverse operations such as decapsulating and decoding. The point cloud file may be sent to the client based on various transport protocols, and the transport protocols herein may include, but are not limited to: a DASH Protocol, an HTTP live streaming (HLS) protocol, a smart media transport protocol (SMTP), a transmission control protocol (TCP), and the like.

A file decapsulation process on the client is reversed to the file encapsulation process, and the client may decapsulate the point cloud file according to a file format during encapsulation to obtain the point cloud stream. A decoding process is also reversed to the encoding process of the client. For example, the client may decode the point cloud stream and restore the media content.

Figure 3:
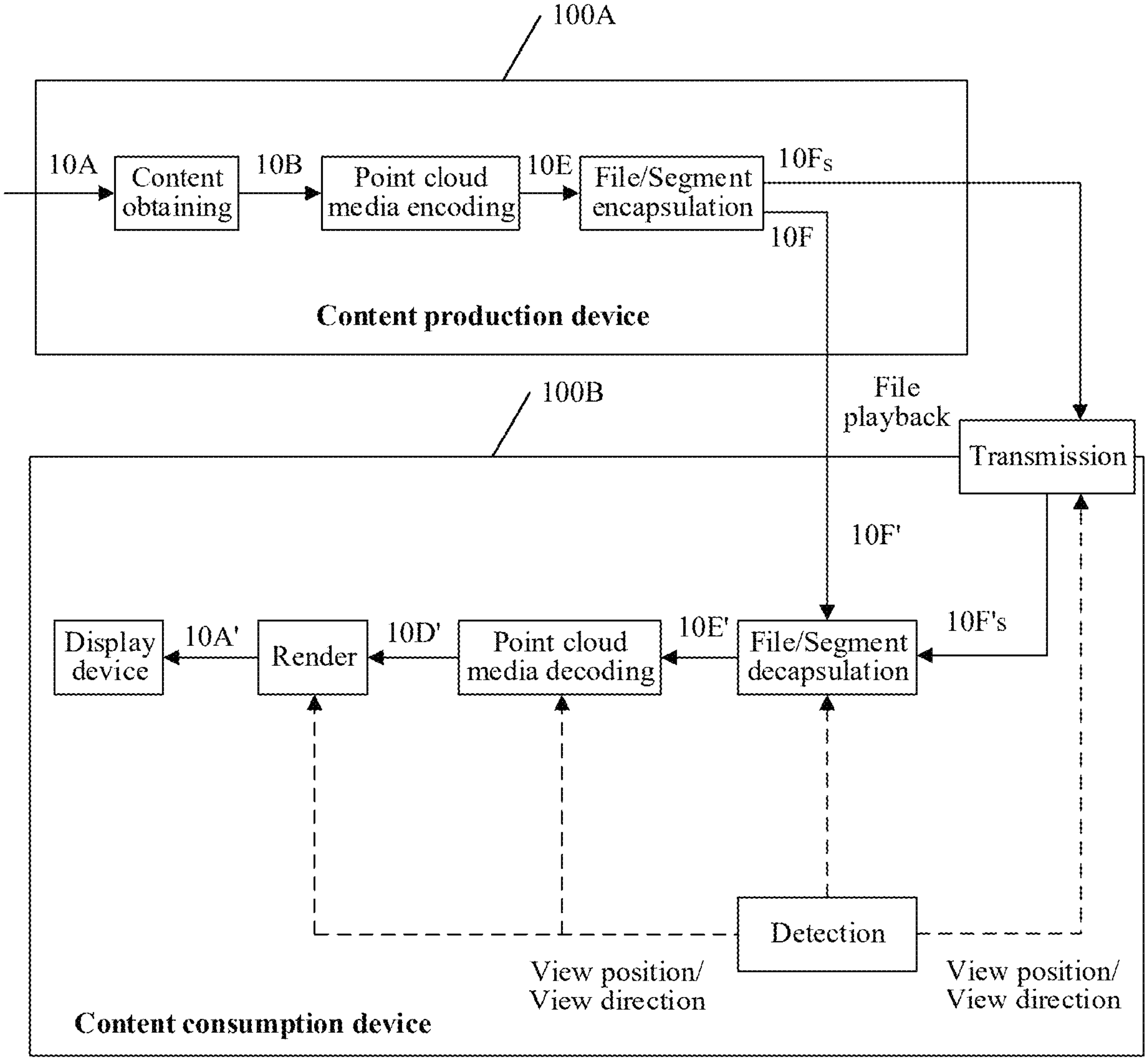
FIG. 3 is a schematic diagram of an architecture of an immersive media system according to some embodiments.

For ease of understanding, refer to FIG. 3. FIG. 3 is a schematic diagram of an architecture of an immersive media system according to some embodiments. As shown in FIG. 3, the immersive media system may include a content production device (for example, a content production device 100A) and a content consumption device (for example, a content consumption device 100B). The content production device may be a computer device used by a provider of point cloud media (for example, a content producer of the point cloud media), and the computer device may be a terminal (for example, a personal computer (PC), a smart mobile device (for example, a smartphone)), or a server. The server may be an independent physical server, may be a server cluster or a distributed system including a plurality of physical servers, or may be a cloud server providing cloud computing services such as a cloud service, a cloud database, cloud computing, a cloud function, cloud storage, a network service, cloud communication, a middleware service, a domain name service, a security service, a CDN, and big data and artificial intelligence platforms. The content consumption device may be a computer device used by a user of the point cloud media (for example, a viewer of the point cloud media, for example, a service object). The computer device may be a terminal (for example, a personal computer (PC), a smart mobile device (for example, a smartphone), a VR device (for example, a VR helmet, and VR glasses), a smart home appliance, a vehicle-mounted terminal, and an aircraft), and the computer device is integrated with a client. The client herein may be a client with a function of displaying data information such as text, an image, audio, and a video, and includes but is not limited to a multimedia client (for example, a video client), a social client (for example, an instant messaging client), an information application (for example, a news client), an entertainment client (for example, a game client), a shopping client, a vehicle-mounted client, a browser, and the like. The client may be an independent client or an embedded sub-client integrated into a client (for example, a social client). This is not limited herein.

A data processing technology for immersive media may be implemented based on a cloud technology. For example, a cloud server is used as the content production device. The cloud technology (Cloud technology) is a hosting technology that unifies a series of resources such as hardware, software, and network in a wide area network or a local area network, to implement data calculation, storage, processing, and sharing.

Data processing of a point cloud media includes data processing on a content production device side and data processing on a content consumption device side.

The data processing on the content production device side includes: (1) an obtaining and production process of media content of the point cloud media, and (2) a process of point cloud media encoding and file encapsulation. The data processing on the content consumption device side may include: (1) a process of file decapsulation and decoding of the point cloud media, and (2) a rendering process of the point cloud media. In addition, a transmission process of the point cloud media is performed between the content production device and the content consumption device. The transmission process may be performed based on various transmission protocols, and the transmission protocols herein may include but are not limited to: a DASH protocol, an HLS protocol, an SMTP protocol, a TCP protocol, and the like.

The following describes the point cloud media data processing in detail with reference to FIG. 3.

1. Data Processing on the Content Production Device Side:

(1) Obtaining and Production Process of the Media Content of the Point Cloud Media:

1) Obtaining Process of the Media Content of the Point Cloud Media:

The media content of the point cloud media is obtained by a capture device through capturing in a sound-visual scene of the real world. In some embodiments, the capture device may be a hardware component provided in the content production device. For example, the capture device is a microphone, a camera lens, a sensor, and the like of a terminal. In another implementation, the capture device may be a hardware device connected to the content production device. For example, a camera lens connected to a server is configured to provide the content production device with an obtaining service of the media content of the point cloud media. The capture device may include but is not limited to an audio device, a camera device, and a sensing device. The audio device may include an audio sensor, a microphone, and the like. The camera device may include an ordinary camera lens, a stereo camera lens, a light field camera lens, and the like. The sensing device may include a laser device, a radar device, and the like. There may be a plurality of capture devices, and these capture devices are deployed at some locations in the real space to capture audio content and video content at different angles in the space, and the captured audio content and video content are synchronized in time and space. In some embodiments, media content of three-dimensional space captured by a capture device deployed at a location to provide multi-degree of freedom (for example, 6DoF) viewing experience may be referred to as point cloud media.

For example, obtaining video content of the point cloud media is used as an example. As shown in FIG. 3, a visual scene 10A (for example, a real-world visual scene) may be captured by a set of camera arrays connected to the content production device 100A, or may be captured by a camera device that has a plurality of camera lenses and sensors and that is connected to the content production device 100A. A capturing result may be source point cloud data 10B (for example, the video content of the point cloud media).

2) Production Process of the Media Content of the Point Cloud Media:

The production process of the media content of the point cloud media according to some embodiments may be understood as a content production process of the point cloud media. The content of the point cloud media herein may be produced in a form of point cloud data or the like captured by cameras or camera arrays deployed at a plurality of locations. For example, the content production device may convert the point cloud media from a three-dimensional representation to a two-dimensional representation. The point cloud media herein may include geometric information, attribute information, placeholder information, atlas data, and the like. The point cloud media may undergo processing before encoding. For example, the point cloud data may be cut and mapped before being encoded.

Collected and inputted three-dimensional representation data (for example, the point cloud data) of the point cloud media may be projected onto a two-dimensional plane through orthogonal projection, perspective projection, and equi-rectangular projection (ERP). The point cloud media projected onto the two-dimensional plane is represented by data of a geometric component, a placeholder component, and an attribute component. The data of the geometric component provides location information of each point of the point cloud media in three-dimensional space. The data of the attribute component provides an additional attribute (for example, color, texture, or material information) of each point of the point cloud media. The data of the placeholder component indicates whether data in another component is associated with the point cloud media.

The component data of the point cloud media in the two-dimensional representation is processed, to generate tiles. A two-dimensional plane area in which the two-dimensional representation of the point cloud media is located is divided into a plurality of rectangular areas with different sizes according to locations of the point cloud media represented in the data of the geometric component. A rectangular area is a tile, and the tile includes information for back projecting the rectangular area to the three-dimensional space.

The tiles are packaged to generate an atlas, and the tiles are put into a two-dimensional grid, to ensure that parts of the tiles do not overlap. Tiles generated by one point cloud media may be packaged into one or more atlas.

Corresponding geometric data, attribute data, and placeholder data are generated based on atlas data, and the atlas data, the geometric data, the attribute data, and the placeholder data are combined to form a final representation of the point cloud media in the two-dimensional plane.

In the content production process of the point cloud media, the geometric component, the placeholder component, or the attribute component may be included.

In addition, a panorama video may be captured by a capture device. Based on the video being processed by the content production device and transmitted to the content consumption device for corresponding data processing, a service object on the content consumption device side may view 360-degree video information by performing some actions (for example, rotating the head), but may not be able to obtain a corresponding video change by performing an action (for example, moving the head), resulting in poor VR experience. Additional depth information that matches the panorama video may be provided, such as with a 6DoF production technology. When the service object can move freely in a simulated scene, this is referred to as 6DoF. When the 6DoF production technology is used to produce the video content of the point cloud media, a laser device, a radar device, and the like are generally used to capture the point cloud data in space.

(2) Process of Point Cloud Media Encoding and File Encapsulation:

The captured audio content may be directly encoded to form an audio stream of the point cloud media. The captured video content may be encoded to obtain a video stream of the point cloud media. If the 6DoF technology is used, an encoding method (for example, a video-based point cloud compression method) may be used in the video encoding process. The audio stream and the video stream are encapsulated in a file container according to a file format (for example, an ISOBMFF) of the point cloud media, to form a media file resource of the point cloud media. The media file resource may be a media file of the point cloud media formed by a media file or a media segment. Metadata of the media file resource of the point cloud media is recorded by using media presentation description information (for example, MPD) according to a file format of the point cloud media. The metadata herein is a general name of information related to presentation of the point cloud media, and the metadata may include description information of the media content, description information of a window, signaling information related to the presentation of the media content, and the like. The content production device stores the media presentation description information and the media file resource formed based on the data processing.

For example, captured audio is encoded into a corresponding audio stream. The geometric information, the attribute information, and the placeholder information of the point cloud media may be encoded in the traditional video encoding method, while the atlas data of the point cloud media may be encoded in an entropy encoding method. The encoded media is encapsulated in a file container according to a format (for example, an ISOBMFF, or HNSS), and is combined with metadata describing media content attributes and window metadata, to form a media file or an initialization segment and a media segment according to the media file format.

For example, as shown in FIG. 3, the content production device 100A performs point cloud media encoding, for example, geometry-based point cloud compression (GPCC, where PCC is point cloud compression) on one or more data frames in the source point cloud data 10B, to obtain an encoded point cloud stream 10E (for example, a video stream, for example, a GPCC stream), including a geometric stream (for example, a stream obtained through encoding the geometric information) and an attribute stream (for example, a stream obtained through encoding the attribute information). The content production device 100A may encapsulate, according to the media file format (for example, the ISOBMFF), one or more encoded streams into a media file 10F for local playback or a segment sequence 10$F_s$ including one initialization segment and a plurality of media segments for streaming transmission. In addition, a file encapsulator in the content production device 100A may also add related metadata to the media file 10F or the segment sequence 10$F_s$. Further, the content production device 100A may transmit the segment sequence 10$F_s$ or the media file 10F to the content consumption device 100B by using a transmission mechanism (for example, DASH or SMT). In some implementations, the content consumption device 100B may be a player.

2. Data Processing on the Content Consumption Device Side:

(3) Process of File Decapsulation and Decoding of the Point Cloud Media:

The content consumption device may adaptively and dynamically obtain the media file resource of the point cloud media and the corresponding media presentation description information from the content production device based on a recommendation of the content production device or the service object on the content consumption device side. For example, the content consumption device may determine a viewing direction and a viewing position of the service object based on position information of the head/eye of the service object and dynamically request the content production device to obtain the corresponding media file resource based on the determined viewing direction and viewing position. The media file resource and the media presentation description information are transmitted from the content production device to the content consumption device by using a transmission mechanism (for example, DASH or SMT). The file decapsulation process on the content consumption device side is reversed to the file encapsulation process on the content production device side. The content consumption device decapsulates the media file resource according to the file format (for example, the ISOBMFF) of the point cloud media, to obtain the audio stream and the video stream. The decoding process on the content consumption device side is reversed to the encoding process on the content production device side, and the content consumption device performs audio decoding on the audio stream to restore the audio content. The content consumption device performs video decoding on the video stream to restore the video content.

For example, as shown in FIG. 3, the media file 10F output by the file encapsulator in the content production device 100A is the same as a media file 10F' input to a file decapsulator in the content consumption device 100B. The file decapsulator performs file decapsulation on the media file 10F' or the received segment sequence 10F's, extracts an encoded point cloud stream 10E', also parses corresponding metadata, performs point cloud media decoding on the point cloud stream 10E', to obtain a decoded video signal 10D', and generates point cloud data (for example, the restored video content) from the video signal 10D'. The media file 10F and the media file 10F' may include a track format definition, which may include constraints on a stream included in a sample in a track.

(4) Rendering Process of the Point Cloud Media:

Based on metadata related to rendering in the media presentation description information corresponding to the media file resource, the content consumption device renders the audio content obtained through audio decoding and the video content obtained through video decoding, and plays and outputs the content when completes the rendering.

For example, as shown in FIG. 3, the content consumption device 100B may render the generated point cloud data based on the current viewing position, viewing direction, or viewport, and display the rendered data on a screen of a head-mounted display or any other display device. The current window may be determined by various types of sensors. For example, the sensors herein may include a head detection sensor, a position detection sensor, or an eye detection sensor. In addition to being used by the content consumption device 100B to obtain an appropriate part of the decoded point cloud data, the current viewing position or viewing direction may also be used for decoding optimization. In addition, in viewport-related transmission, the current viewing position and viewing direction are also transferred to a strategy module in the content consumption device 100B, and the strategy module may determine a to-be-received track based on the current viewing position and viewing direction.

As can be learned from the foregoing, the content consumption device may dynamically obtain the media file resource corresponding to the point cloud media from the content production device side. The media file resource is obtained by the content production device by encoding and encapsulating the captured audio and video content. Based on receiving the media file resource returned by the content production device, the content consumption device may decapsulate the media file resource to obtain the corresponding audio and video streams, and decode the audio and video streams, to finally present the decoded audio and video content to the service object. The point cloud media here may include but is not limited to video-based point cloud compression (VPCC) point cloud media and geometric-based point cloud compression (GPCC) point cloud media.

A point cloud sequence is a highest level syntax structure of the point cloud stream. The point cloud sequence starts with sequence header information (referred to as a sequence header for short), followed by one or more point cloud frames. Each point cloud frame may be preceded by geometric header information (referred to as a geometric header for short), attribute header information (referred to as an attribute header for short), and one or more pieces of point cloud slice data. The point cloud slice data (slice) herein includes a geometric slice header, geometric information, an attribute slice header, and attribute information. In some embodiments, the attribute data included in the point cloud data or the point cloud stream may be divided into corresponding attribute data groups, each attribute data group corresponds to an attribute type, and each attribute data group includes one or more pieces of attribute data under the corresponding attribute type. In some embodiments, an attribute data group in the point cloud data may be an unencoded attribute data group or an encoded attribute data group. Similarly, an attribute data group in the point cloud stream may be an undecoded attribute data group or a decoded attribute data group. Attribute types may include but are not limited to a color attribute, a reflectance attribute, a normal vector attribute, a material attribute, and the like. To improve encoding efficiency of the point cloud data, many point cloud encoding technologies support cross-type attribute prediction. For example, when encoding a current attribute data group, encoding efficiency of the current attribute data group may be improved in a manner by using information (for example, a value obtained based on color RGB encoding, and a value obtained based on reflectance encoding) about a previously encoded attribute data group. A decoding process is reversed to an encoding process. When decoding a current attribute data group, decoding efficiency of the current attribute data group may also be improved by using information about a previously decoded attribute data group. For the convenience of understanding and distinguishing, in some embodiments, the currently encoded (or decoded) attribute data group is referred to as a target attribute data group, and an attribute data group (if any) that is referenced for encoding (or decoding) the target attribute data group is referred to as a reference attribute data group. For example, it is assumed that point cloud data includes a plurality of attribute data groups of a plurality of attribute types, for example, a color attribute data group 1, a color attribute data group 2, a color attribute data group 3, a reflectance attribute data group 1, and a reflectance attribute data group 2. If the reflectance attribute data group 2 is currently being encoded, one or more of the color attribute data group 1, the color attribute data group 2, and the color attribute data group 3 may be referenced, or a color attribute data group and the reflectance attribute data group 1 may be referenced, or an attribute data group or an attribute data group of an attribute type may be referenced by default. A reference situation of an encoding end corresponds to this. As can be learned from this, prediction reference relationships between different attribute data groups may be different. There may be one color attribute data group and one reflectance attribute data group by default, so that an association relationship between the two is defined by indication (for example, encoding/decoding of a single color attribute data group depends on a single reflectance attribute data group, or encoding/decoding of a single reflectance attribute data group depends on a single color attribute data group, or there is no dependency relationship between the two). As can be learned from this, the existing method may be limited for multi-attribute point cloud data and a multi-attribute point cloud stream.

For the problem that indication of multi-attribute data groups is not clear in the current point cloud encoding technology, some embodiments provide an indication method of high-level syntax information of a point cloud stream, to concretize an association relationship between various attribute data groups. For example, content production device may encode obtained point cloud data. Assuming that the point cloud data includes at least two attribute data groups, an attribute prediction relationship mode corresponding to a target attribute data group may be first determined in an attribute encoding process. The target attribute data group herein is an attribute data group with a group identifier in the at least two attribute data groups, and the at least two attribute data groups further include one or more to-be-referenced attribute data groups that meet the attribute prediction relationship mode with the target attribute data group. Further, when prediction states of the target attribute data group for the one or more to-be-referenced attribute data groups are prediction on states, the content production device may determine a reference attribute data group corresponding to the target attribute data group in the one or more to-be-referenced attribute data groups, and may further encode the target attribute data group based on the reference attribute data group or direct encode the target attribute data group. Based on encoding, an obtained point cloud stream may be encapsulated into a media file of immersive media, and the media file may be transmitted to the content consumption device for consumption. In some embodiments, the attribute data groups may be distinguished by a specified identifier (for example, the group identifier corresponding to the target attribute data group), and a prediction reference relationship between the attribute data groups may be further concretized, so that the reference attribute data group that is referenced during attribute encoding can be quickly determined in the corresponding one or more to-be-referenced attribute data groups, to implement attribute prediction between a plurality of attribute data groups, and finally improve encoding efficiency of multi-attribute point cloud data.

Similar to the encoding process, the content consumption device may decapsulate the received media file to obtain the corresponding point cloud stream, and decode the point cloud stream. In this process, the attribute prediction relationship mode corresponding to the target attribute data group may be obtained, and the reference attribute data group corresponding to the target attribute data group may be determined in the to-be-referenced attribute data groups when the prediction states of the target attribute data group for the one or more to-be-referenced attribute data groups are prediction on states. The reference attribute data group herein may be configured for participating in decoding the target attribute data group or not participating in decoding the target attribute data group. In some embodiments, based on the prediction reference relationship between the attribute data groups, the reference attribute data group that is referenced during attribute decoding may be quickly obtained in the one or more corresponding to-be-referenced attribute data groups, to implement attribute prediction in a plurality of attribute data groups, and improve decoding efficiency of the multi-attribute point cloud stream.

The method provided in some embodiments may be applied to components such as a server end (for example, the content production device side), a player end (for example, the content consumption device side), and intermediate nodes (for example, a smart media transport (SMT) receiving entity and an SMT sending entity) in the immersive media system, and may also be applied to a point cloud compression-related product. For a process in which the content production device determines the attribute prediction relationship mode corresponding to the target attribute data group, determines the reference attribute data group corresponding to the target attribute data group, and encodes the target attribute data group, and the content consumption device obtains the attribute prediction relationship mode corresponding to the target attribute data group, determines the reference attribute data group corresponding to the target attribute data group, and decodes the target attribute data group, refer to some embodiments according to FIG. 4 and FIG. 5 below.

Figure 4:
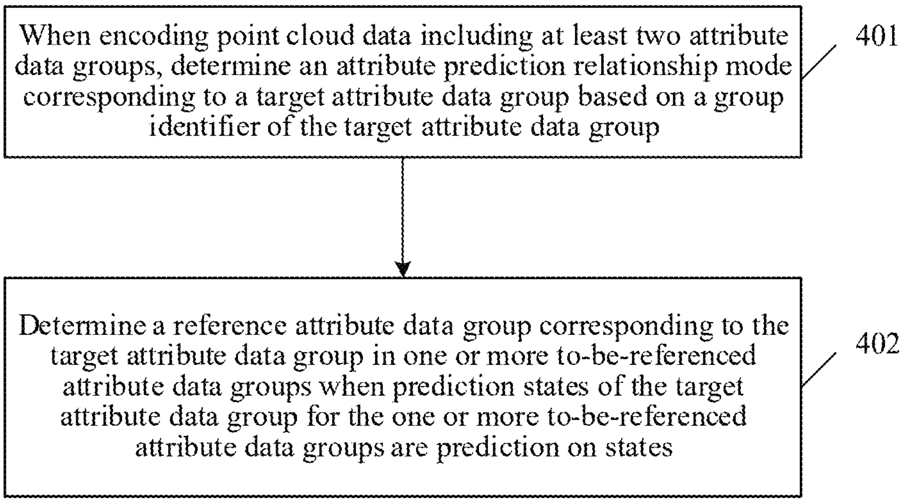
FIG. 4 is a schematic flowchart of a data processing method for immersive media according to some embodiments.

Further, FIG. 4 is a schematic flowchart of a data processing method for immersive media according to some embodiments. The method may be performed by a content production device in an immersive media system (for example, the content production device 100A in some embodiments according to FIG. 3). For example, the content production device may be a server. Some embodiments is described by using an example in which the server performs the method. The method may include operations 401 and 402.

401: When encoding point cloud data including at least two attribute data groups, determine an attribute prediction relationship mode corresponding to a target attribute data group based on a group identifier of the target attribute data group.

For example, server may obtain point cloud data of a real-world three-dimensional object or scene through a capture device (for example, a camera array including a plurality of cameras), or the server may generate point cloud data of a virtual three-dimensional object or scene. The point cloud data herein may represent a spatial structure and a surface attribute (for example, a color, and a material) of the corresponding three-dimensional object or scene. Further, the server may encode the obtained point cloud data. The encoding process includes encoding geometric data and encoding attribute data, and some embodiments describe the encoding process of the attribute data. It is assumed that the point cloud data includes at least two attribute data groups. Attribute types and a quantity of the attribute data groups are not limited herein. The attribute prediction relationship mode corresponding to the target attribute data group may be first determined during encoding of the target attribute data group.

The target attribute data group is an attribute data group with the group identifier in the at least two attribute data groups, and each attribute data group may have a unique identifier for ease of distinguishing. The target attribute data group may be any to-be-encoded attribute data group in the at least two attribute data groups by changing the group identifier, and a corresponding attribute parameter may be further identified by the group identifier. In some embodiments, the group identifier may be an index, a label, or a symbol of the target attribute data group, and the content of the group identifier is not limited herein.

The at least two attribute data groups may further include one or more to-be-referenced attribute data groups that meet the attribute prediction relationship mode with the target attribute data group. A quantity of to-be-referenced attribute data groups is not limited herein. In some embodiments, the attribute prediction relationship mode may also be referred to as a multi-attribute association relationship mode, and may include but is not limited to an inter-attribute prediction mode and a default attribute prediction mode. The inter-attribute prediction mode may include but is not limited to a cross-attribute prediction mode, a within-attribute prediction mode, and a general attribute prediction mode. The cross-attribute prediction mode is an attribute prediction mode crossing attribute types, and may be configured for prediction between the different attribute types. The within-attribute prediction mode is an attribute prediction mode of a same attribute type, and may be configured for prediction of the same attribute type. The general attribute prediction mode may include any one or more of the cross-attribute prediction mode and the within-attribute prediction mode, and may be configured for prediction between unlimited attribute types. The default attribute prediction mode is an attribute prediction mode that is enabled by default by both an encoding end and a decoding end. The attribute prediction relationship mode corresponding to the target attribute data group is specified, so that one or more to-be-referenced attribute data groups that meet the attribute prediction relationship mode with the target attribute data group can be quickly obtained. For example, attribute types corresponding to the one or more to-be-referenced attribute data groups are related to the specified attribute prediction relationship mode. For example, when an attribute type of the target attribute data group is a color attribute, if the supported attribute prediction relationship mode is the within-attribute prediction mode, the corresponding attribute types of the one or more to-be-referenced attribute data groups are also color attributes.

Attribute prediction relationship modes supported by attribute data groups of different attribute types may be the same or different, and attribute prediction relationship modes supported by a plurality of attribute data groups of a same attribute type may be the same or different. However, the disclosure is not limited thereto.

In some embodiments, if the attribute prediction relationship mode corresponding to the target attribute data group is the cross-attribute prediction mode, the within-attribute prediction mode, or the general attribute prediction mode, the server may further obtain prediction states of the target attribute data group for the one or more to-be-referenced attribute data groups. In some embodiments, the prediction state may include a prediction on state and a prediction off state, and the predicted on state herein may indicate that the target attribute data group enables a corresponding attribute prediction relationship mode for the one or more to-be-referenced attribute data groups. Conversely, the prediction off state may indicate that the target attribute data group does not enable the attribute prediction relationship mode.

In some embodiments, if the attribute prediction relationship mode corresponding to the target attribute data group is a default attribute prediction mode, for example, a parameter indicating the attribute prediction relationship mode is not transmitted, and an encoding end (for example, a server end) and a decoding end (for example, a client end) jointly agree to enable an attribute prediction relationship mode (for example, one of the cross-attribute prediction mode, the within-attribute prediction mode, and the general attribute prediction mode) as the default attribute prediction mode, the server may determine the reference attribute data group corresponding to the target attribute data group in the corresponding one or more to-be-referenced attribute data groups, and may encode the target attribute data group based on the reference attribute data group or directly encode the target attribute data group. For implementation details, refer to the related descriptions in operation 402.

In some embodiments, the encoding end and the decoding end may not enable any attribute prediction relationship mode by default. For example, any encoded attribute data group is not referenced during current attribute encoding.

Some embodiments may support a plurality of manners to determine the attribute prediction relationship mode corresponding to the target attribute data group. These manners may be implemented through field expansion at a high-level syntax level of a stream, for example, adding a mode flag field that indicates the attribute prediction relationship mode to a parameter set associated with the point cloud data. Several feasible implementations are listed below:

In some embodiments, a first mode flag field that carries the group identifier may be added to the parameter set (for example, a sequence parameter set or an attribute parameter set) associated with the point cloud data. The first mode flag field herein may indicate that the attribute prediction relationship mode corresponding to the target attribute data group with the group identifier is the cross-attribute prediction mode. The at least two attribute data groups include one or more to-be-referenced attribute data groups that meet the cross-attribute prediction mode with the target attribute data group, and the attribute types corresponding to the one or more to-be-referenced attribute data groups are different from the attribute type corresponding to the target attribute data group.

The first mode flag field may be a flag bit, and different values may indicate whether the target attribute data group enables the cross-attribute prediction mode. In some embodiments, when a field value of the first mode flag field is a first flag value (for example, the value is 1), prediction states of the target attribute data group for the one or more to-be-referenced attribute data groups may be prediction on states. In some embodiments, when a field value of the first mode flag field is a second flag value (for example, the value is 0), prediction states of the target attribute data group for the one or more to-be-referenced attribute data groups are prediction off states.

For example, in some embodiments, an identifier (for example, the group identifier) of a current attribute data group is attrIdx, and the server may set the flag bit (for example, the first mode flag field) crossAttrTypePred[attrIdx] in attribute header information (for example, attribute_header) associated with the point cloud data. When crossAttrTypePred[attrIdx]=1 (for example, the first flag value), the attribute data group (for example, the target attribute data group) currently corresponding to attrIdx enables cross-type attribute prediction. On the contrary, when crossAttrTypePred[attrIdx]=0 (for example, the second flag value), the attribute data group currently corresponding to attrIdx does not enable cross-type attribute prediction.

In some embodiments, a second mode flag field that carries the group identifier may be added to the parameter set (for example, a sequence parameter set or an attribute parameter set) associated with the point cloud data. The second mode flag field herein may indicate that the attribute prediction relationship mode corresponding to the target attribute data group with the group identifier is the within-attribute prediction mode. The at least two attribute data groups include one or more to-be-referenced attribute data groups that meet the within-attribute prediction mode with the target attribute data group, and the attribute types corresponding to the one or more to-be-referenced attribute data groups are the same as the attribute type corresponding to the target attribute data group.

The second mode flag field may be a flag bit, and different values may indicate whether the target attribute data group enables the within-attribute prediction mode. In some embodiments, when a field value of the second mode flag field is a third flag value (for example, the value is 1), prediction states of the target attribute data group for the one or more to-be-referenced attribute data groups are prediction on states. In some embodiments, when a field value of the second mode flag field is a fourth flag value (for example, the value is 0), prediction states of the target attribute data group for the one or more to-be-referenced attribute data groups are prediction off states.

For example, in some embodiments, an identifier (for example, the group identifier) of a current attribute data group is attrIdx, and the server may set the flag bit (for example, the second mode flag field) withinAttrTypePred[attrIdx] in attribute header information (for example, attribute_header) associated with the point cloud data. When withinAttrTypePred[attrIdx]=1 (for example, the third flag value), the attribute data group (for example, the target attribute data group) currently corresponding to attrIdx enables within-type attribute prediction. On the contrary, when withinAttrTypePred[attrIdx]=0 (for example, the fourth flag value), the attribute data group currently corresponding to attrIdx does not enable within-type attribute prediction.

In some embodiments, a third mode flag field that carries the group identifier may be added to the parameter set (for example, a sequence parameter set or an attribute parameter set) associated with the point cloud data. The third mode flag field herein may indicate that the attribute prediction relationship mode corresponding to the target attribute data group with the group identifier is the general attribute prediction mode. The at least two attribute data groups include one or more to-be-referenced attribute data groups that meet the general attribute prediction mode with the target attribute data group, and the attribute types corresponding to the one or more to-be-referenced attribute data groups are the same as or different from the attribute type corresponding to the target attribute data group. For example, the attribute types corresponding to the one or more to-be-referenced attribute data groups are not limited.

The third mode flag field may be a flag bit, and different values may indicate whether the target attribute data group enables the general attribute prediction mode. In some embodiments, when a field value of the third mode flag field is a fifth flag value (for example, the value is 1), prediction states of the target attribute data group for the one or more to-be-referenced attribute data groups are prediction on states. In some embodiments, when a field value of the third mode flag field is a sixth flag value (for example, the value is 0), prediction states of the target attribute data group for the one or more to-be-referenced attribute data groups are prediction off states.

For example, in some embodiments, an identifier (for example, the group identifier) of a current attribute data group is attrIdx, and the server may set the flag bit (for example, the third mode flag field) crossAttrPred[attrIdx] in attribute header information (for example, attribute_header) associated with the point cloud data. When crossAttrPred [attrIdx]=1 (for example, the fifth flag value), the attribute data group (for example, the target attribute data group) currently corresponding to attrIdx enables unlimited-type attribute prediction. On the contrary, when crossAttrPred [attrIdx]=0 (for example, the sixth flag value), the attribute data group currently corresponding to attrIdx does not enable unlimited-type attribute prediction.

In some embodiments, a first mode flag field and a second mode flag field that carry the group identifier may be added to the parameter set (for example, a sequence parameter set or an attribute parameter set) associated with the point cloud data. The first mode flag field and the second mode flag field herein may jointly indicate that the attribute prediction relationship mode corresponding to the target attribute data group with the group identifier is the general attribute prediction mode. The at least two attribute data groups include one or more to-be-referenced attribute data groups that meet the general attribute prediction mode with the target attribute data group.

Both the first mode flag field and the second mode flag field may be flag bits, and may indicate whether the target attribute data group enables a corresponding attribute prediction mode (for example, any one or more of the cross-attribute prediction mode and the within-attribute prediction mode) through different value combinations.

In some embodiments, when a field value of the first mode flag field is a first flag value (for example, the value is 1) and a field value of the second mode flag field is a third flag value (for example, the value is 1), prediction states of the target attribute data group for the one or more to-be-referenced attribute data groups are prediction on states, and in this case, the attribute types corresponding to the one or more to-be-referenced attribute data groups are the same as or different from the attribute type corresponding to the target attribute data group. For example, unlimited-type attribute prediction is enabled.

In some embodiments, when a field value of the first mode flag field is a second flag value (for example, the value is 0) and a field value of the second mode flag field is the third flag value (for example, the value is 1), prediction states of the target attribute data group for the one or more to-be-referenced attribute data groups are prediction on states, and in this case, the attribute types corresponding to the one or more to-be-referenced attribute data groups are the same as the attribute type corresponding to the target attribute data group. For example, within-type attribute prediction is enabled.

In some embodiments, when a field value of the first mode flag field is the first flag value (for example, the value is 1) and a field value of the second mode flag field is a fourth flag value (for example, the value is 0), prediction states of the target attribute data group for the one or more to-be-referenced attribute data groups are prediction on states, and the attribute types corresponding to the one or more to-be-referenced attribute data groups are different from the attribute type corresponding to the target attribute data group. For example, cross-type attribute prediction is enabled.

In some embodiments, when a field value of the first mode flag field is the second flag value (for example, the value is 0) and a field value of the second mode flag field is the fourth flag value (for example, the value is 0), prediction states of the target attribute data group for the one or more to-be-referenced attribute data groups are prediction off states, and the attribute types corresponding to the one or more to-be-referenced attribute data groups are the same as or different from the attribute type corresponding to the target attribute data group in this case. For example, unlimited-type attribute prediction is not enabled.

For example, in some embodiments, an identifier (for example, the group identifier) of a current attribute data group is attrIdx, and the server may set the flag bit crossAttrTypePred[attrIdx](for example, the first mode flag field) and withinAttrTypePred[attrIdx](for example, the second mode flag field) in attribute header information (for example, attribute_header) associated with the point cloud data. When crossAttrTypePred[attrIdx]=1 (for example, the first flag value) and withinAttrTypePred[attrIdx]=1 (for example, the third flag value), the attribute data group (for example, the target attribute data group) currently corresponding to attrIdx enables unlimited-type attribute prediction. When crossAttrTypePred[attrIdx]=0 (for example, the second flag value) and withinAttrTypePred[attrIdx]=1, the attribute data group currently corresponding to attrIdx enables within-type attribute prediction. When crossAttrTypePred[attrIdx]=1 and withinAttrTypePred[attrIdx]=0 (for example, the fourth flag value), the attribute data group currently corresponding to attrIdx enables cross-type attribute prediction. When crossAttrTypePred[attrIdx]=0 and withinAttrTypePred[attrIdx]=0, the attribute data group currently corresponding to attrIdx does not enable unlimited-type attribute prediction. As can be learned from this, a combination of two flag bits may indicate a corresponding prediction state while indicating a type of a current attribute prediction relationship mode, and indicated content may be richer than that indicated by one flag bit (for example, a third mode flag field).

Several implementations described in some embodiments include expansion or redefinition (for example, crossAttrTypePred) of an existing field, and also include some newly added fields (for example, withinAttrTypePred and crossAttrPred). These fields are combined with the group identifier (for example, attrIdx), so that an attribute prediction relationship mode and a prediction state corresponding to each attribute data group can be quickly specified. This is equivalent to initially establishing a prediction reference relationship network for the plurality of attribute data groups. Attribute prediction relationship modes corresponding to different attribute data groups may be the same or different. In some implementations, the mode flag field (for example, the first mode flag field, the second mode flag field, or the third mode flag field) may not carry the group identifier. For example, in a scenario in which an attribute header is individually set for each attribute data group, or in a scenario in which a plurality of attribute data groups are indicated by using one attribute header, when the attribute prediction relationship modes corresponding to all the attribute data groups are the same, the group identifier may not be carried. Other similar methods are not listed herein one by one, and a method may be determined according to an actual requirement. However, the disclosure is not limited thereto.

402: Determine a reference attribute data group corresponding to the target attribute data group in the one or more to-be-referenced attribute data groups when the prediction states of the target attribute data group for the one or more to-be-referenced attribute data groups are prediction on states.

Based on determining the attribute prediction relationship mode corresponding to the target attribute data group, the server may further determine the reference attribute data group that may be referenced for encoding the target attribute data group. In some embodiments, when the prediction states of the target attribute data group for the one or more to-be-referenced attribute data groups are prediction on states, or when the attribute prediction relationship mode corresponding to the target attribute data group is a default attribute prediction mode, the server may determine the reference attribute data group corresponding to the target attribute data group in the corresponding one or more to-be-referenced attribute data groups. The reference attribute data group herein may be configured for participating in encoding the target attribute data group or not participating in encoding the target attribute data group. This is not limited. When the target attribute data group is encoded based on the reference attribute data group, there is a nearest neighbor search process in attribute prediction. In this process, a previously encoded attribute value (for example, a reconstructed value) may be used to improve efficiency of current attribute encoding.

In some embodiments, a plurality of manners may be supported to determine the reference attribute data group corresponding to the target attribute data group and encode the target attribute data group. Several feasible implementations are listed below:

In some embodiments, the server may add a reference group identifier to the attribute header information associated with the point cloud data. The reference group identifier herein may indicate any attribute data group, for example, may indicate a single reference attribute data group corresponding to the target attribute data group in the one or more to-be-referenced attribute data groups. The reference group identifier may or may not carry the group identifier, and this may be determined according to actual used syntax. The reference group identifier and the group identifier are to be uniform in nature, but values may be different. For example, when the group identifier is an index of the target attribute data group, the reference group identifier is an index of the reference attribute data group. In some embodiments, a parameter value of the reference group identifier may be defaulted at a codec end (for example, a default reference attribute data group specified by the codec end is referenced for encoding the target attribute data group, for example, the first attribute data group in all the attribute data groups). Further, when the target attribute data group is encoded depending on an attribute prediction parameter group, the server may encode the target attribute data group based on the attribute prediction parameter group and the reference attribute data group indicated by the reference group identifier. When the target attribute data group is encoded without depending on the attribute prediction parameter group, the target attribute data group may be encoded directly. Whether the target attribute data group is encoded depending on the attribute prediction parameter group may be defaulted at the codec end, or indicated by setting a field value of a mode flag field. For example, when a field value of a mode flag field (for example, the first mode flag field, the second mode flag field, or the third mode flag field) corresponding to the target attribute data group is an enable flag value (indicating a value used when the mode flag field indicates an enable state, for example, a value of the first mode flag field may be the first flag value), the target attribute data group is encoded depending on the attribute prediction parameter group. For example, even if a reference attribute data group is specified in a manner (which is, for example, defaulted by the codec end, or is specified by a reference group identifier), whether to reference the specified attribute data group for encoding may be different for each attribute data group, and the attribute prediction parameter group is used when the specified attribute data group is referenced. The attribute prediction parameter group may include one or more attribute parameters in an attribute prediction process of the target attribute data group, and content and a quantity of attribute parameters included in the attribute prediction parameter group are not limited herein.

The method provided in some embodiments, adds descriptive fields to the point cloud stream includes a field expansion at a high-level syntax level of the stream, and may support different multi-attribute support solutions. The "group identifier" and the "reference group identifier" may have different definitions when being used in syntax of different solutions. For ease of understanding and illustration, the following describes an extension based on two existing solutions, and other similar solutions may also refer to the descriptions of the two solutions.

To support the foregoing operations, some embodiments adds several descriptive fields to a system layer, and defines a point cloud high-level syntax information indication method by using a form of extending a high-level syntax of an AVS GPCC stream as an example. The following describes related fields expanded in the high-level syntax of the AVS GPCC stream in detail in combination with related syntax.

For example, for ease of understanding, refer to Table 1. Table 1 indicates syntax of an attribute header information structure (attribute_header) of the point cloud media provided in some embodiments:

TABLE 1

| | Descriptor |
|---|---|
| attribute_header( ) { | |
| for ( attrIdx = 0; attrIdx < (maxNumAttributesMinus1 + 1); attrIdx ++ ){ | |
| attributeDataType[attrIdx] | u(1) |
| outputBitDepthMinus1[ attrIdx ] | ue(v) |
| maxNumOfNeighboursLog2Minus7[ attrIdx ] | u(2) |
| numOflevelOfDetail[ attrIdx ] | ue(v) |
| maxNumOfPredictNeighbours[ attrIdx ] | ue(v) |
| intraLodFlag[ attrIdx ] | u(1) |
| reorderMode[ attrIdx ] | ue(v) |
| golombNum[ attrIdx ] | ue(v) |
| coeffLengthControl[ attrIdx ] | ue(v) |
| crossAttrTypePred[ attrIdx ] | u(1) |
| if (crossAttrTypePred[ attrIdx ]){ | |
| attrIdx_pred[ attrIdx ] | ue(v) |

TABLE 1-continued

| | Descriptor |
|---|---|
| crossAttrTypePredParam1[ attrIdx ] | u(15) |
| crossAttrTypePredParam2[ attrIdx ] | u(21) |
| } | |
| if (attributeDataType[attrIdx] == 0) { | |
| cross_component_Pred[ attrIdx ] | u(1) |
| orderSwitch[ attrIdx ] | u(1) |
| half_zero_runlength_enable[ attrIdx ] | u(1) |
| chromaQpOffsetCb[ attrIdx ] | se(v) |
| chromaQpOffsetCr[ attrIdx ] | se(v) |
| } | |
| if (attributeDataType[attrIdx] == 1) { | |
| nearestPredParam1[ attrIdx ] | ue(v) |
| nearestPredParam2[ attrIdx ] | ue(v) |
| axisBias[ attrIdx ] | ue(v) |
| } | |
| transform[ attrIdx ] | ue(v) |
| if (transform[ attrIdx ]>0 ) { | |
| maxNumofCoeff[ attrIdx ] | ue(v) |
| attrTransformQpDelta[ attrIdx ] | ue(v) |
| initPredTransRatio[ attrIdx ] | se(v) |
| transResLayer[ attrIdx ] | u(1) |
| attrTransformNumPoints[ attrIdx ] | ue(v) |
| maxTransNum[ attrIdx ] | ue(v) |
| QpOffsetDC[ attrIdx ] | se(v) |
| QpOffsetAC[ attrIdx ] | se(v) |
| if (attributeDataType[attrIdx] == 0) { | |
| chromaQpOffsetDC[ attrIdx ] | se(v) |
| chromaQpOffsetAC[ attrIdx ] | se(v) |
| } | |
| if (attributeDataType[attrIdx] == 1) { | |
| RefGroupPred[ attrIdx ] | u(1) |
| } | |
| } | |
| byte_alignment( ) | |
| } | |

The attribute header information structure shown in Table 1 distinguishes attribute data groups by unique identifiers attrIdx, and supports a plurality of groups of point cloud data including a same point cloud type. attributeDataType[attrIdx] indicates an attribute type of an attribute data group corresponding to attrIdx. A value being 0 indicates that the attribute data group is color data. A value being 1 indicates that the attribute data group is reflectance data, and another value may be taken to indicate an attribute type other than color and reflectance. This is not limited herein. maxNumAttributesMinus1 is an unsigned integer, and maxNumAttributesMinus1 plus 1 represents a maximum quantity of attribute encode data groups supported by a stream in this standard. A value of maxNumAttributesMinus1 is an integer between 0 and 15. When maxNumAttributesMinus1 is not present in a stream, maxNumAttributesMinus1 is 0 by default. crossAttrTypePred may be the first mode flag field described above. attrIdx is an identifier of a corresponding attribute data group. For example, if there are currently 5 attribute data groups, attrIdx corresponding to each attribute data group may be 0, 1, 2, 3, and 4 successively, and an attribute type of each attribute data group is indicated by attributeDataType[attrIdx]. For example, in the solution shown in Table 1, the "group identifier" (for example, attrIdx in Table 1) and the "reference group identifier" (for example, attrIdx_pred in Table 1) each are a unique identifier for a corresponding attribute data group, and the values of both are one-dimensional values. For example, in this case, a group of data instances for each point cloud data type may correspond to a unique attribute data identifier (for example, data group identifier).

Based on this, in the solution shown in Table 1, any attribute data group in the point cloud data may be indicated by the reference group identifier. For example, when a value of the reference group identifier is a first symbol value, the corresponding reference attribute data group is the first attribute data group in the at least two attribute data groups. In some embodiments, when a value of the reference group identifier is a second symbol value, the corresponding reference attribute data group is the first attribute data group of an attribute type (for example, the first attribute data group of the color attribute). The attribute type is not limited herein. In some embodiments, when a value of the reference group identifier is a third symbol value, the corresponding reference attribute data group is a previous attribute data group of the target attribute data group, and a difference between the value of the group identifier and the third symbol value is 1. In addition, another value may be used for the reference group identifier to indicate the corresponding reference attribute data group, and is not listed herein. For same point cloud data, the values of the first symbol value, the second symbol value, and the third symbol value may be the same or different. This is not limited.

For example, assuming that the point cloud data includes two color attribute data groups (corresponding data group identifiers are 0 and 2 successively) and two reflectance attribute data groups (corresponding data group identifiers are 1 and 3 successively), and an attribute data group 2 is currently encoded (for example, attrIdx=2), when attrIdx_pred[2]=0, the reference attribute data group corresponding to the attribute data group 2 is the first attribute data group (for example, an attribute data group 0). When attrIdx_pred[2]=1, the reference attribute data group corresponding to the attribute data group 2 is the first attribute data group of reflectance attribute (for example, an attribute data group 1). When attrIdx_pred[2]=2−1 (for example, attrIdx−1), the reference attribute data group corresponding to the attribute data group 2 is a previous attribute data group of the attribute data group 2.

The target attribute data group in some embodiments is a currently encoded attribute data group, and the reference attribute data group on which the target attribute data group depends may be an encoded attribute data group. However, in some cases (for example, when the reference attribute data group is directly specified without considering an encoding order, such as the first implementation), if an encoding order of the reference attribute data group is later than an encoding order of the target attribute data group, the current target attribute data group cannot be predicted and encoded based on the reference attribute data group, and the target attribute data group may be encoded directly in this case, or a previously encoded attribute data group of the target attribute data group may be referenced by default (for example, the previous attribute data group of the target attribute data group).

For example, in some embodiments, if the target attribute data group is encoded depending on the attribute prediction parameter group, and the value of the group identifier is greater than the value of the reference group identifier, the encoding order of the reference attribute data group is earlier than the encoding order of the target attribute data group, and the server may set the attribute prediction parameter group corresponding to the target attribute data group in this case. The attribute prediction parameter group herein may include crossAttrTypePredParam or another parameter, for example, a first attribute prediction weight parameter (for example, crossAttrTypePredParam1 in Table 1) and a second attribute prediction weight parameter (for example, crossAttrTypePredParam2 in Table 1). crossAttrTypePredParam1 (or referred to as a cross-type attribute prediction weight parameter 1) is a 15-bit unsigned integer, and may be configured for controlling a weight parameter 1 for calculating a geometric information distance and an attribute information distance in corresponding attribute prediction (for example, cross-type attribute prediction). crossAttrTypePredParam2 (or referred to as a cross-type attribute prediction weight parameter 2) is a 21-bit unsigned integer, and may be configured for controlling a weight parameter 2 for calculating a geometric information distance and an attribute information distance in corresponding attribute prediction (for example, cross-type attribute prediction). Further, the server may encode the target attribute data group based on the first attribute prediction weight parameter, the second attribute prediction weight parameter, and the reference attribute data group, for example, may substitute the three into a related algorithm for calculation to find the prediction point, and an encoding process is not expanded here.

For another example, in some embodiments, the server may first set the attribute prediction parameter group corresponding to the target attribute data group, and similarly, the attribute prediction parameter group may also include a first attribute prediction weight parameter and a second attribute prediction weight parameter. If the target attribute data group is encoded depending on the attribute prediction parameter group, and the value of the group identifier is larger than the value of the reference group identifier, the target attribute data group may be encoded based on the first attribute prediction weight parameter, the second attribute prediction weight parameter, and the reference attribute data group.

In the method in some embodiments, the server may first determine values of the group identifier and the reference group identifier, and set the corresponding attribute prediction parameter group on the premise of meeting a prior condition. In the method in some embodiments, the server first sets the attribute prediction parameter group, and determines, based on a determining condition, whether to enable the preset attribute prediction parameter group. In an actual application, any one of the methods may be selected, and the disclosure is not limited thereto.

In some embodiments, the values of the group identifier and the reference group identifier do not meet the condition. For example, when the value of the group identifier is less than or equal to the value of the reference group identifier, the server may directly encode the target attribute data group.

Further, for ease of understanding, refer to Table 2. Table 2 indicates syntax of an attribute header information structure (attribute_header) of the point cloud media provided in some embodiments:

TABLE 2

| | Descriptor |
|---|---|
| attribute_header( ) { | |
| for ( attrIdx = 0; attrIdx < (maxNumAttributesMinus1 + 1); attrIdx ++ ){ | |
| attributePresentFlag [ attrIdx ] | u(1) |
| if(attributePresentFlag [ attrIdx ]){ | |
| if(sps_multi_data_set_flag) | |
| multi_data_set_flag[attrIdx] | u(1) |
| if(multi_data_set_flag[attrIdx]) | |
| attribute_num_data_set_minus1[attrIdx] | ue(v) |
| for(i=0;i< (attribute_num_data_set_minus1[attrIdx]+1); i++){ | |
| outputBitDepthMinus1[ attrIdx ][i] | ue(v) |
| if (attrIdx == 0 \|\| attrIdx == 1) { | |
| maxNumOfNeighboursLog2Minus7[ attrIdx ][i] | u(2) |
| outputBitDepthMinus1[ attrIdx ] [i] | ue(v) |
| maxNumOfNeighboursLog2Minus7[ attrIdx ] [i] | u(2) |
| numOflevelOfDetail[ attrIdx ] [i] | ue(v) |
| maxNumOfPredictNeighbours[ attrIdx ] [i] | ue(v) |
| intraLodFlag[ attrIdx ] [i] | u(1) |
| reorderMode[ attrIdx ] [i] | ue(v) |
| golombNum[ attrIdx ] [i] | ue(v) |
| coeffLengthControl[ attrIdx ] [i] | ue(v) |
| crossAttrTypePred[ attrIdx ] [i] | u(1) |
| if (crossAttrTypePred[ attrIdx ] [i]){ | |
| attrIdx_pred[ attrIdx ] [i] | ue(v) |
| crossAttrTypePredParam1[ attrIdx ] [i] | u(15) |
| crossAttrTypePredParam2[ attrIdx ] [i] | u(21) |
| } | |
| } | |
| if (attrIdx == 0) { | |
| cross_component_Pred[i] | u(1) |
| ...... | |
| } | |
| if (attrIdx == 1) { | |
| nearestPredParam1[i] | ue(v) |
| ...... | |
| } | |
| transform[ attrIdx ][i] | ue(v1) |
| if(transform[attrIdx][i]&&attributePresentFlag [ attrIdx ] ) { | |
| maxNumofCoeff[attrIdx ][i] | ue(v) |
| attrTransformQpDelta[ attrIdx ][i] | ue(v) |
| initPredTransRatio[ attrIdx ][i] | se(v) |
| transResLayer[ attrIdx ][i] | u(1) |
| attrTransformNumPoints[ attrIdx ][i] | ue(v) |
| maxTransNum[ attrIdx ][i] | ue(v) |
| QpOffsetDC[ attrIdx ][i] | se(v) |
| QpOffsetAC[ attrIdx ][i] | se(v) |
| if ( attributePresentFlag[0]) { | |

TABLE 2-continued

| | Descriptor |
|---|---|
| chromaQpOffsetDC[i] | se(v) |
| chromaQpOffsetAC[i] | se(v) |
| colorQuantParam | ue(v) |
| } | |
| if ( attributePresentFlag[1]) { | |
| RefGroupPred[i] | u(1) |
| reflQuantParam | ue(v) |
| } | |
| } //if (transform && ( attributePresentFlag[idx] | |
| } // for(i=0;i< Num | |
| } // if(attributePresentFlag [ attrIdx ]){ | |
| }//for( attrIdx= 0; attrIdx < (maxNumAttributesMinus1 | |
| byte_alignment( ) | |
| } | |

In the attribute header information structure shown in Table 2, a point cloud attribute type is bound with the identifier attrIdx, an attribute parameter is represented by a corresponding index i, and a plurality of groups of point cloud data of a same point cloud type is supported. maxNumAttributesMinus1 is an unsigned integer, and maxNumAttributesMinus1 plus 1 represents a maximum quantity of attribute encode data groups supported by a stream in this standard. A value of maxNumAttributesMinus1 is an integer between 0 and 15. When maxNumAttributesMinus1 is not present in the stream, maxNumAttributesMinus1 is −1 by default. attributePresentFlag[attrIdx] is an attribute present flag, and is a binary variable, and a value '1' indicates that this stream includes encoding for the attrIdx$^{th}$ attribute. A value '0' indicates that this stream does not include encoding for the attrIdx$^{th}$ attribute. When sps_multi_data_set_flag equals to 1, supporting of a multi-attribute data set is enabled. When sps_multi_data_set_flag equals to 0, supporting of a multi-attribute data set is disabled. When sps_multi_data_set_flag is not present in the stream, a default value of sps_multi_data_set_flag is zero. When multi_data_set_flag[attrIdx] equals to 1, an attribute determined by the attribute type index attrIdx enables supporting of a multi-attribute data set. When multi_data_set_flag[attrIdx] equals to 0, an attribute determined by the attribute type index attrIdx disables supporting of a multi-attribute data set. When the syntax element is not present in the stream, a default value of the syntax element is zero. attribute_num_data_set_minus1 [attrIdx] plus one specifies a quantity of multi-attribute data sets supported by the attribute determined by the attribute type index attrIdx, and is a number between 0 and 15. When the syntax element is not present in the stream, a default value is zero. crossAttrTypePred is the first mode flag field described above. attrIdx is an integer between 0 and 15, and its meaning is shown in Table 3:

TABLE 3

| attr_idx | Attribute description |
|---|---|
| 0 | Color |
| 1 | Reflectance |
| 2 . . . 15 | Reserved |

As can be learned from Table 3, when a value of attrIdx is 0, the attribute data group is color data. A value being 1 indicates that the attribute data group is reflectance data, and another value may be taken to indicate an attribute type other than color and reflectance. This is not limited herein.

In the solution shown in Table 2, attrIdx and i are used together. Therefore, "group identifier" and "reference group identifier" may have many meanings. Details are as follows:

In some embodiments, the group identifier may be a target attribute type index (for example, attrIdx in Table 2) corresponding to the target attribute data group, and correspondingly, the reference group identifier may be a reference attribute type index (for example, attrIdx_pred in Table 2) corresponding to the reference attribute data group. Both are one-dimensional values. For example, the group identifier and the reference group identifier indicate an attribute type of a corresponding attribute data group. When the value of the reference group identifier is a fourth sign value (for example, a value 0), the reference attribute data group may be a default attribute data group having an attribute type (for example, a color attribute) indicated by the fourth sign value. The default attribute data group herein is a default attribute data group at the codec end, and may not be specified by an additional parameter. For example, the reference attribute data group may be the first attribute data group of the color attribute. A value of the fourth sign value is not limited.

In some embodiments, the group identifier may be a target data group index (for example, i in Table 2) corresponding to the target attribute data group, and correspondingly, the reference group identifier may be a reference data group index (for example, attrIdx_pred in Table 2) corresponding to the reference attribute data group. Both are one-dimensional values. For example, the group identifier and the reference group identifier indicate an index of a corresponding attribute data group. When the value of the reference group identifier is a fifth sign value (for example, i=1), the reference attribute data group may be an attribute data group with a default attribute type and identified by the fifth sign value. The default attribute type herein is the default attribute type (for example, reflectance attribute) at the codec end, and may not be specified by an additional parameter. For example, the reference attribute data group may be the i$^{th}$ attribute data group of the reflectance attribute. A value of the fifth sign value is not limited.

In some embodiments, the group identifier may include the target attribute type index (for example, attrIdx in Table 2) and the target data group index (for example, i in Table 2) corresponding to the target attribute data group, and correspondingly, the reference group identifier (for example, attrIdx_pred in Table 2) may include a reference attribute type index and a reference data group index corresponding to the reference attribute data group. Both the group identifier and the reference group identifier are two-dimensional arrays. In some embodiments, when a value of the reference attribute type index is a first index value, and a value of the reference data group index is a second index value (for example, i=0), the reference attribute data group may be the first attribute data group in the at least two attribute data groups. The first index value is an index value corresponding to the first encoded attribute type. When the value of the reference attribute type index is a third index value, and the value of the reference data group index is the second index value (for example, i=0), the reference attribute data group may be the first attribute data group of an attribute type indicated by the third index value. A value of the third index value is not limited. When the value of the reference attribute type index is the same as the value of the target attribute type index, and the value of the reference data group index is a fourth index value, the reference attribute data group is a previous attribute data group of the target attribute data group, and a difference between the value of the target data group index and the fourth index value is 1. For example, the fourth index value=i−1. Other values are not listed herein.

For a scenario in which both the group identifier and the reference group identifier are two-dimensional arrays, the server may further determine the attribute prediction parameter group corresponding to the target attribute data group. Details are as follows:

In some embodiments, when the target attribute data group is encoded depending on the attribute prediction parameter group, and the value of the reference attribute type index is the same as the value of the target attribute type index, the target attribute data group and the reference attribute data group have a same attribute type. If the value of the target data group index is greater than the value of the reference data group index, an encoding order of the reference attribute data group is earlier than an encoding order of the target attribute data group, and the server may set the attribute prediction parameter group corresponding to the target attribute data group in this case. The attribute prediction parameter group herein may include a first attribute prediction weight parameter (for example, crossAttrTypePredParam1 in Table 2) and a second attribute prediction weight parameter (for example, crossAttrTypePredParam2 in Table 2). For the semantics, refer to descriptions in Table 1. The server may encode the target attribute data group based on the first attribute prediction weight parameter, the second attribute prediction weight parameter, and the reference attribute data group.

In some embodiments, the server may first set the attribute prediction parameter group (including the first attribute prediction weight parameter and the second attribute prediction weight parameter) corresponding to the target attribute data group. If the target attribute data group is encoded depending on the attribute prediction parameter group, the value of the reference attribute type index is the same as the value of the target attribute type index, and the value of the target data group index is greater than the value of the reference data group index, the target attribute data group may be encoded based on the first attribute prediction weight parameter, the second attribute prediction weight parameter, and the reference attribute data group.

In some embodiments, when the target attribute data group is encoded depending on the attribute prediction parameter group, the value of the reference attribute type index is different from the value of the target attribute type index, and the encoding order of the attribute type indicated by the reference attribute type index is before the attribute type indicated by the target attribute type index, the server may set the attribute prediction parameter group corresponding to the target attribute data group. The attribute prediction parameter group herein may include the first attribute prediction weight parameter and the second attribute prediction weight parameter. The server may encode the target attribute data group based on the first attribute prediction weight parameter, the second attribute prediction weight parameter, and the reference attribute data group.

In some embodiments, the server may first set the attribute prediction parameter group (including the first attribute prediction weight parameter and the second attribute prediction weight parameter) corresponding to the target attribute data group. If the target attribute data group is encoded depending on the attribute prediction parameter group, the value of the reference attribute type index is the different from the value of the target attribute type index, and an encoding order of an attribute type indicated by the reference attribute type index is earlier than an encoding order of an attribute type indicated by the target attribute type index, the target attribute data group may be encoded based on the first attribute prediction weight parameter, the second attribute prediction weight parameter, and the reference attribute data group.

In some embodiments, the server may add, to the attribute header information associated with the point cloud data, a reference group identifier list carrying the group identifier. The reference group identifier list herein may include one or more reference group identifiers, and each reference group identifier indicates a reference attribute data group corresponding to the target attribute data group in the one or more to-be-referenced attribute data groups. A quantity of reference group identifiers included in the reference group identifier list is not limited. For example, one or more reference attribute data groups may be referenced for encoding the target attribute data group. In some embodiments, the codec end may default to the parameter values of the group identifier list (for example, default to one or more reference attribute data groups specified by the codec end). Further, when the target attribute data group is encoded depending on the attribute prediction parameter group, the server may set an attribute prediction parameter group associated with each reference attribute data group, and further may encode the target attribute data group based on the set attribute prediction parameter group and the reference attribute data group.

The reference group identifier list provided in some embodiments is also applicable to the syntax shown in Tables 1 and 2. attrIdx_pred in the table may be replaced with attrIdx_pred_list (for example, a dynamic identifier list), which is equivalent to specifying one or more attrIdx_pred through one attrIdx_pred_list. In this case, for the meaning of the group identifier and the meaning of each reference group identifier in the corresponding reference group identifier list, refer to the related descriptions in the foregoing first implementation and are not repeated herein.

In some embodiments, the one or more reference attribute data groups corresponding to the reference group identifier list each may be an attribute data group encoded before the target attribute data group, and an attribute type corresponding to each reference attribute data group may be the same or different from the attribute type corresponding to the target attribute data group. The one or more reference attribute data groups may all be attribute data groups that are encoded before the target attribute data group and that are of an attribute type. The one or more reference attribute data groups may all be encoded attribute data groups of an attribute type, and are not enumerated in some embodiments. The attribute type here may be any specified type.

The attribute prediction parameter group corresponding to each reference attribute data group may be independently set, or attribute prediction parameter groups corresponding to reference attribute data groups of a same attribute type are shared, or attribute prediction parameter groups corresponding to each reference attribute data group are shared, or the attribute prediction parameter group may be specified in another manner. However, the disclosure is not limited thereto.

In some embodiments, the server may add, to the attribute header information associated with the point cloud data, an attribute codec order field that carries the group identifier or an attribute codec order field that does not carry the group identifier. The attribute codec order field that carries the group identifier may indicate a codec order used by the target attribute data group for an attribute type. For example, codec orders used by attribute data groups for the attribute type may be the same or different. The attribute codec order field that does not carry the group identifier indicates a codec order used by at least two attribute data groups for an attribute type. For example, all attribute data groups use a same codec order for the attribute type. The codec order herein is a general name of an encoding order and a decoding order, and may be an encoding order at the encoding end and a decoding order at the decoding end, both of which are the same. The server may determine the reference attribute data group corresponding to the target attribute data group in the one or more to-be-referenced attribute data groups based on the attribute codec order field. When the target attribute data group is encoded depending on the attribute prediction parameter group, the target attribute data group may be encoded based on the attribute prediction parameter group and the reference attribute data group.

Compared with the foregoing two implementations, the third implementation may consider the encoding order of the attribute types. This can reduce a prediction failure case in which the reference attribute data group used for encoding the target attribute data group is encoded based on the target attribute data group, and can improve indication validity of the reference attribute data group.

For example, for ease of understanding, refer to Table 4. Table 4 indicates syntax of an attribute header information structure (attribute_header) of the point cloud media provided in some embodiments:

TABLE 4

| | Descriptor |
|---|---|
| attribute_header( ) { | |
| for ( attrIdx = 0; attrIdx < (maxNumAttributesMinus1 + 1); attrIdx ++ ){ | |
| attributeDataType[attrIdx] | u(1) |
| ...... | |
| if (crossAttrTypePred[ attrIdx ]){ | |
| attrEncodeOrder[ attrIdx ] | ue(v) |
| crossAttrTypePredParam1[ attrIdx ] | u(15) |
| crossAttrTypePredParam2[ attrIdx ] | u(21) |
| } | |
| if (attributeDataType[attrIdx] == 0) { | |
| cross_component_Pred[ attrIdx ] | u(1) |
| ...... | |
| } | |
| if (attributeDataType[attrIdx] == 1) { | |
| nearestPredParam1[ attrIdx ] | ue(v) |
| ...... | |
| } | |
| transform[ attrIdx ] | ue(v) |
| ...... | |
| } | |

The attribute header information structure shown in Table 4 is similar to the attribute header information structure shown in Table 1. For semantics of related syntax, refer to the related descriptions in Table 1. attrEncodeOrder[attrIdx] is the attribute codec order field that caries the group identifier attrIdx. A corresponding attribute codec order field may be set for each attribute data group corresponding to attrIdx.

Similarly, refer to Table 5. Table 5 indicates syntax of an attribute header information structure (attribute_header) of the point cloud media provided in some embodiments:

TABLE 5

| | Descriptor |
|---|---|
| attribute_header( ) { | |
| attrEncodeOrder | ue(v) |
| for ( attrIdx = 0; attrIdx < (maxNumAttributesMinus1 + 1); attrIdx ++ ){ | |
| attributeDataType[attrIdx] | u(1) |
| ...... | |
| if (crossAttrTypePred[ attrIdx ]){ | |
| crossAttrTypePredParam1[ attrIdx ] | u(15) |
| crossAttrTypePredParam2[ attrIdx ] | u(21) |
| } | |
| if (attributeDataType[attrIdx] == 0) { | |
| cross_component_Pred[ attrIdx ] | u(1) |
| ...... | |
| } | |
| if (attributeDataType[attrIdx] == 1) { | |
| nearestPredParam1[ attrIdx ] | ue(v) |
| ...... | |
| } | |
| transform[ attrIdx ] | ue(v) |
| ...... | |
| } | |

Similarly, the attribute header information structure shown in Table 5 is similar to the attribute header information structure shown in Table 1. For semantics of related syntax, refer to the related descriptions in Table 1. attrEncodeOrder is the attribute codec order field that does not carry the group identifier attrIdx. All attribute data groups use the same attribute codec order field.

In some embodiments, assuming that a total quantity of attribute types corresponding to the at least two attribute data groups is N and N is a positive integer, a field value of the attribute codec order field (carrying or not carrying the group identifier) may be an index value corresponding to a codec order in an attribute type codec order table associated with the at least two attribute data groups. Each codec order of attribute types in the attribute type codec order table herein is a codec order corresponding to the N attribute types. For example, assuming that there are four attribute types, for example, an attribute type A, an attribute type B, an attribute type C, and an attribute type D. The attribute type codec order table includes two codec orders. When attrEncodeOrder=0, a corresponding codec order is {A, B, C, D}. When attrEncodeOrder=1, the corresponding codec order is {A, C, B, D}. The attribute codec order field may describe a specified codec order corresponding to N attribute types, for example, the codec order of the four attribute types may be specified as {A, B, C, D} by the attribute codec order field.

Based on this, assuming that the attribute type corresponding to the target attribute data group is ordered as N1 in the codec order (for example, the encoding order) corresponding to the N attribute types, and N1 is a positive integer less than or equal to N, a process in which the server determines the reference attribute data group corresponding to the target attribute data group in the one or more to-be-referenced attribute data groups may be as follows: According to the codec order corresponding to the N attribute types indicated by the attribute codec order field, the $N2^{th}$ attribute type before the attribute type corresponding to the target attribute data group is used as a pre-predicted attribute type (for example, single attribute data prediction), or N2 attribute types before the attribute type corresponding to the target attribute data group are used as pre-predicted attribute types (for example, multi-attribute data prediction), where N2 is a positive integer less than N1. Further, the server may determine the reference attribute data group corresponding to the target attribute data group in to-be-referenced attribute data groups of the pre-predicted attribute type included in the one or more to-be-referenced attribute data groups. The reference attribute data group corresponding to the target attribute data group may be set by default at the codec end. For example, the first to-be-referenced attribute data group of the pre-predicted attribute type may be used as the reference attribute data group, or all the to-be-referenced attribute data groups of the pre-predicted attribute type may be used as the reference attribute data groups. In this default method, another related parameter may not be transmitted to specify the reference attribute data group. For easy understanding, the codec order {A, C, B, D} is used as an example. When the attribute type corresponding to the target attribute data group is the attribute type B, the first attribute data group (or all attribute data groups) of the attribute type A may be referenced by default, or the first attribute data group (or all attribute data groups) of the attribute type C may be referenced by default, or the first attribute data group (or all attribute data groups) of the attribute type A and the first attribute data group (or all attribute data groups) of the attribute type C may be referenced by default.

In some embodiments, the server may first use all attribute types before the attribute type corresponding to the target attribute data group as pre-predicted attribute types according to the codec order of the attribute types indicated by the attribute codec order field, further add, based on the pre-predicted attribute types to the attribute header information associated with the point cloud data, a reference group identifier (for example, attrIdx_pred) that carries or does not carry the group identifier, and specify the reference attribute data group by the added reference group identifier. For the process, refer to the related descriptions in the first implementation. The attribute type corresponding to the attribute data group indicated by the reference group identifier herein belongs to the pre-predicted attribute type. Further, the to-be-referenced attribute data group with the reference group identifier may be used as the reference attribute data group corresponding to the target attribute data group. In some embodiments, a reference group identifier list (for example, attrIdx_pred_list) that carries or does not carry the group identifier may be added to the attribute header information associated with the point cloud data, and the reference attribute data group may be specified by the added reference group identifier list. For a process, refer to the related descriptions in the second implementation. In some embodiments, one or more to-be-referenced attribute data groups of a pre-predicted attribute type may be used as reference attribute data groups by default at the codec end.

The server may set the attribute prediction parameter group corresponding to the reference attribute data group, and encode the target attribute data group based on the set attribute prediction parameter group and the reference attribute data group, or directly encode the target attribute data group. For implementation details, refer to the related descriptions.

In some embodiments, the reference attribute data group corresponding to the target attribute data group may be a default attribute data group of the server and the client, and parameters such as the reference group identifier, the reference group identifier list, and the attribute codec order field may be transmitted. The default attribute data group may be the first attribute data group or all attribute data groups of an attribute type, or may be a previous attribute data group of the target attribute data group. However, the disclosure is not limited thereto.

In some embodiments, the parameter set associated with the point cloud data always includes a mode flag field, and the server may determine the reference attribute data group by setting a field value of the associated mode flag field. The mode flag field may include but is not limited to the first mode flag field, the second mode flag field, and the third mode flag field (refer to the related descriptions in operation 401).

For example, in some embodiments, it is assumed that the point cloud data includes two attribute data groups and one to-be-referenced attribute data group. For example, when there are two attribute data groups, one attribute data group may be referenced. In this case, in some embodiments, if the field value of the mode flag field corresponding to the target attribute data group and the field value of the mode flag field corresponding to the to-be-referenced attribute data group are both set to an enable flag value (for example, the value is 1), and the encoding order of the target attribute data group is later than the encoding order of the to-be-referenced attribute data group, the to-be-referenced attribute data group may be used as the reference attribute data group corresponding to the target attribute data group. In this case, the attribute prediction parameter group corresponding to the target attribute data group may be set, and the attribute prediction parameter group corresponding to the reference attribute data group may not be set. The attribute prediction parameter groups corresponding to the target attribute data group and the reference attribute data group may be set to a same value. For example, when there are two attribute data groups, if the field values of the mode flag fields corresponding to the two attribute data groups are set to the enable flag value, there is a reference dependency relationship between the both, and there is one reference situation in this case. For example, the attribute data group encoded later references the attribute data group encoded earlier.

In some embodiments, if the field value of the mode flag field corresponding to the target attribute data group is set to the enable flag value (for example, the value is 1), and the field value of the mode flag field corresponding to the to-be-referenced attribute data group is set to a disable flag value (for example, the value is 0), the to-be-referenced attribute data group may be used as the reference attribute data group corresponding to the target attribute data group. For example, when there are two attribute data groups, a field value of a mode flag field corresponding to an attribute data group (for example, an attribute data group 1) encoded later may be set to the enable flag value, and a field value of a mode flag field corresponding to the other attribute data group (for example, an attribute data group 2) may be set to the disable flag value. The attribute data group 2 may be referenced for encoding the attribute data group 1, and an attribute prediction parameter group corresponding to the attribute data group 1 may be set instead of an attribute prediction parameter group corresponding to the attribute data group 2.

For example, for ease of understanding, refer to Table 6. Table 6 indicates syntax of an attribute header information structure of the point cloud media provided in some embodiments:

TABLE 6

| | Descriptor |
|---|---|
| attribute_header( ) { | |
| attributeType | u(4) |
| attributeID | u(8) |
| outputBitDepthMinus1 | ue(v) |
| maxNumOfNeighboursLog2Minus7 | u(2) |
| ... | |
| crossAttrTypePred | u(1) |
| if (crossAttrTypePred){ | |
| crossAttrTypePredParam1 | u(15) |
| crossAttrTypePredParam2 | u(21) |
| } | |
| QuantParam | ue(v) |
| ReorderMode | ue(v) |
| GolombNum | ue(v) |
| if (attributeType == 0) { | |
| ... | se(v) |
| chromaQpOffsetCr | se(v) |
| } | |
| if (attributeType == 1) { | |
| ... | ue(v) |
| axisBias | ue(v) |
| } | |
| } | |
| } | |
| transform | ue(v) |
| if (transform > 0 ) { | |
| Log2maxNumofCoeffMinus8 | ue(v) |
| ... | se(v) |
| if (attribute Type == 0) { | |
| chromaQpOffsetDC | se(v) |
| chromaQpOffsetAC | se(v) |
| } | |
| if (attributeType == 1) { | |
| RefGroupPred | u(1) |
| } | |
| } | |
| byte_alignment( ) | |
| } | |

The attribute header information structure shown in Table 6 uses an independent attribute parameter information header (aps-attribute parameter set), and may support one group of attribute dependency. Different from the solution shown in Table 1 or Table 2, in the solution in Table 6, a corresponding attribute data group is also indicated by a data group identifier attributeID (similar to attrIdx in Table 1). However, the attribute data group corresponding to each attributeID uses an independent attribute header, and the identifier may not be used as a subscript or suffix of an attribute parameter in the syntax shown in Table 6. In the case of two attribute data groups, a reference relationship between the two attribute data groups may be represented by setting a field value of crossAttrTypePred (for example, the mode flag field) corresponding to each attribute data group without additional information.

For another example, in some embodiments, it is assumed that the point cloud data includes more than two attribute data groups and M to-be-referenced attribute data groups, and M is a positive integer greater than or equal to 2. When a quantity of reference attribute data groups corresponding to the target attribute data group is limited to 1, there may be one reference attribute data group. In this case, the reference attribute data group in the M to-be-referenced attribute data groups may be determined by adding a corresponding reference group identifier. In this case, in some embodiments, if the field value of the mode flag field corresponding to the target attribute data group and field values of mode flag fields corresponding to the M to-be-referenced attribute data groups are all set to the enable flag value (for example, the value is 1), the reference group identifier may be added to a related parameter set, so that a to-be-referenced attribute data group with the reference group identifier in the M to-be-referenced attribute data groups may be used as the reference attribute data group corresponding to the target attribute data group, and an encoding order of the reference attribute data group is earlier than an encoding order of the target attribute data group. Similarly, in this case, the attribute prediction parameter group corresponding to the target attribute data group may be set, or the attribute prediction parameter group corresponding to the target attribute data group and the reference attribute data group may be set to the same value.

In some embodiments, if the field value of the mode flag field corresponding to the target attribute data group is set to the enable flag value (for example, the value is 1), and the field values of the mode flag fields corresponding to the M to-be-referenced attribute data groups are all set to the disable flag value (for example, the value is 0), the target attribute data group may reference one attribute data group in the M to-be-referenced attribute data groups, and a reference group identifier may be added to a related parameter set, so that the to-be-referenced attribute data group with the reference group identifier in the M to-be-referenced attribute data groups may be used as the reference attribute data group corresponding to the target attribute data group, and an encoding order of the reference attribute data group is earlier than an encoding order of the target attribute data group. Similarly, the attribute prediction parameter group corresponding to the target attribute data group may be set.

For example, for ease of understanding, refer to Table 7. Table 7 indicates syntax of an attribute header information structure of the point cloud media provided in some embodiments:

TABLE 7

| | Descriptor |
|---|---|
| attribute_header( ) { | |
| attributeType | u(4) |
| attributeID | u(8) |
| outputBitDepthMinus1 | ue(v) |
| maxNumOfNeighboursLog2Minus7 | u(2) |
| ... | ... |
| crossAttrTypePred | u(1) |
| if (crossAttrTypePred){ | |
| attrIdx_pred | ue(v) |
| crossAttrTypePredParam1 | u(15) |
| crossAttrTypePredParam2 | u(21) |
| } | |
| QuantParam | ue(v) |
| ReorderMode | ue(v) |
| GolombNum | ue(v) |
| ...... | |
| } | |

The attribute header information structure shown in Table 7 is similar to the attribute header information structure shown in Table 6, is represented by an independent attribute parameter information header, and may support a case of one reference attribute data group. When corresponding crossAttrTypePred (for example, a mode flag field) indicates presence of a plurality of to-be-referenced attribute data groups (for example, crossAttrTypePred of three attribute data groups are set to 1), attrIdx_pred (for example, the reference group identifier) may be introduced to determine a reference attribute data group.

The information indicating method shown in the fourth implementation may cover the existing information indicating methods (for example, there are two attribute data groups by default, or there is one reference attribute data group by default), and the method provided by some embodiments is more explicit in indicating between attribute data groups.

As can be learned from the above, the server may concretize a prediction reference relationship between the plurality of attribute data groups by a reference group identifier, a reference group identifier list, an attribute codec order field, a mode flag field, a default manner, or the like, to implement operations such as prediction between corresponding attribute data groups.

In addition, some embodiments also supports identifying and distinguishing some general attribute parameters. Details are as follows:

The attribute header information associated with the point cloud data includes a general attribute parameter. In some embodiments, it is assumed that the general attribute parameter does not depend on an attribute type determining condition (for example, if (attributeDataType[attrIdx]==0) and if (attributeDataType[attrIdx]==1) in Table 1, or if (attrIdx==0) and if (attrIdx==1) in Table 2). In some embodiments, when the general attribute parameter is independent of the attribute type, the server may add a group identifier to identify the general attribute parameter associated with the target attribute data group. The general attribute parameter herein may include a length control parameter (for example, coeffLengthControl), and the length control parameter may represent a control zero run length. As shown in Table 1, coeffLengthControl[attrIdx] may indicate coeffLengthControl, and coeffLengthControl[attrIdx] does not depend on a wavelet transform determining condition (for example, if (transform[attrIdx]>0 in Table 1). For example, the length control parameter coeffLengthControl [attrIdx] may still be used when transform[attrIdx] is greater than or equal to 0. In addition, the general attribute parameter herein may further include parameters such as outputBitDepthMinus1 and maxNumOfNeighboursLog2Minus7. For details, refer to Table 1 or Table 2. The parameters are not listed one by one herein. In some embodiments, general attribute parameters such as transform and coeffLengthControl may be identified without a group identifier. In this case, all attribute data groups may share a same general attribute parameter.

In some embodiments, when the general attribute parameter is associated with an attribute type, the attribute type associated with the general attribute parameter is present, and the attribute type is not identified in a field of the general attribute parameter, the server may add a group identifier to identify the general attribute parameter associated with the target attribute data group. The general attribute parameter may include a general attribute encoding order parameter and a general attribute encoding index Golomb number. For example, refer to Table 1. reorderMode[attrIdx] may indicate the general attribute encoding order parameter reorderMode. Similarly, golombNum[attrIdx] may indicate the general attribute encoding index Golomb number golombNum. For another example, refer to Table 2. reorderMode[attrIdx][i] may indicate the general attribute encoding order parameter reorderMode. Similarly, golombNum[attrIdx][i] may indicate the general attribute encoding index Golomb number golombNum.

In some embodiments, it is assumed that the general attribute parameter depends on an attribute type determining condition (for example, if (attributeDataType[attrIdx]==0) and if (attributeDataType[attrIdx]==1) in Table 1, or if (attrIdx==0) and if (attrIdx==1) in Table 2). In some embodiments, when the general attribute parameter is associated with an attribute type, the attribute type associated with the general attribute parameter is present, and the attribute type is identified in a field of the general attribute parameter, the server may add a group identifier to identify the general attribute parameter associated with the target attribute data group. The general attribute parameter herein may include a color attribute encoding order parameter corresponding to the color attribute, a color attribute encoding index Golomb number corresponding to the color attribute, a reflectance attribute encoding order parameter corresponding to the reflectance attribute, and a reflectance attribute encoding index Golomb number corresponding to the reflectance attribute. For example, refer to Table 1 above, colorReorderMode[attrIdx] may indicate the color attribute encoding order parameter colorReorderMode. colorGolombNum[attrIdx] may indicate the color attribute encoding index Golomb number colorGolombNum, and colorReorderMode[attrIdx] and colorGolombNum[attrIdx] are in a related statement of a corresponding attribute type determining condition (for example, if (attributeDataType[attrIdx]==0). Similarly, refReorderMode[attrIdx] may indicate the reflectance attribute encoding order parameter refReorderMode. refGolombNum[attrIdx] may indicate the reflectance attribute encoding index Golomb number refGolombNum, and refReorderMode[attrIdx] and refGolombNum[attrIdx] are in a related statement of a corresponding attribute type determining condition (for example, if (attributeDataType[attrIdx]==1).

In some embodiments, when the general attribute parameter is related to an attribute type, the attribute type related to the general attribute parameter is present, and a same attribute type corresponds to a same general attribute parameter, the general attribute parameter may not be identified. For example, the attribute data groups of the same attribute type share a set of general attribute parameters. The general attribute parameters herein may include a color attribute encoding order parameter (for example, colorReorderMode) corresponding to the color attribute, a color attribute encoding index Golomb number (for example, colorGolombNum) corresponding to the color attribute, a reflectance attribute encoding order parameter (for example, refReorderMode) corresponding to the reflectance attribute, and a reflectance attribute encoding index Golomb number (for example, refGolombNum) corresponding to the reflectance attribute.

In addition, the parameter set associated with the point cloud data includes general parameters (including a geometric parameter and an attribute parameter), and representation forms of these general parameters may be original forms or power exponent forms. The power exponent forms may include a first power exponent form and a second power exponent form. In some embodiments, when a representation form of a general parameter is the original form, a value of the general parameter in the original form is L, and L is a positive integer. In some embodiments, when a representation form of a general parameter is the first power exponent form, a value of the general parameter in the first power exponent form is L1, and $L=2^{L1}$, where L1 is a nonnegative integer less than L. In some embodiments, when a representation form of a general parameter is the second power exponent form, a value of the general parameter in the second power exponent form is L2, and $L=2^{L2+L3}$, where L2 and L3 are all nonnegative integers less than L, L3 is a fixed constant, and L2+L3=L1.

A length control parameter is used as an example. When a representation form of the length control parameter is the original form, a value of the length control parameter (for example, coeffLengthControl) in the original form is L (for example, L=4096). When a representation form of the length control parameter is the first power exponent form, whether to limit a range of the parameter may be selected. A value of the length control parameter in the first power exponent form (for example, coeffLengthControlLog2, which may be an unsigned integer) is L1 (for example, L1=12), and $L=2^{L1}$. When a representation form of the length control parameter is the second power exponent form, whether to limit a range of the parameter may be selected. A value of the length control parameter in the second power exponent form (for example, coeffLengthControlLog2Minus8, which may be an unsigned integer) is L2 (for example, L2=4), $L=2^{L2+L3}$, and L3=8 in this case.

Based on obtaining the corresponding point cloud stream through the encoding process, the server may encapsulate the point cloud stream into a media file of immersive media. For example, the server may flexibly encapsulate the point cloud stream into one or more file tracks based on the high-level syntax information in the point cloud stream, and the file tracks may be divided into one or more sub-samples. The server may transmit the media file (for example, a point cloud file) to the client.

As can be learned from the above, in some embodiments, the attribute data groups may be distinguished by a specified identifier (for example, the group identifier corresponding to the target attribute data group), and a prediction reference relationship between the attribute data groups may be further concretized, so that the reference attribute data group that is referenced during attribute encoding can be quickly determined in the corresponding one or more to-be-referenced attribute data groups, to implement attribute prediction between a plurality of attribute data groups, and finally improve encoding efficiency of multi-attribute point cloud data. In addition, in some embodiments, meanings of multi-attribute parameters (for example, the general attribute parameters) may also be defined by using corresponding data group identifiers. This implements the representation modes of multi-type and multi-group attribute parameters. According to some embodiments, the geometric data and various types of attribute data in the point cloud stream may be organized more flexibly in a unit of point cloud slice, to support a more flexible file encapsulation and transmission mode and more diversified point cloud application forms.

Figure 5:
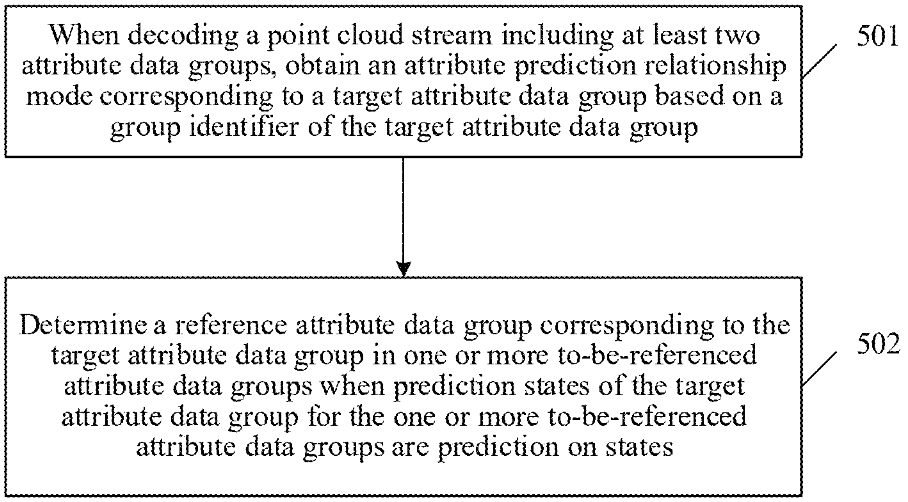
FIG. 5 is a schematic flowchart of a data processing method for immersive media according to some embodiments.

Further, FIG. 5 is a schematic flowchart of a data processing method for immersive media according to some embodiments. The method may be performed by a content consumption device in an immersive media system (for example, the content consumption device 100B in some embodiments according to FIG. 3). For example, the content consumption device may be a terminal integrated with a client (for example, a video client). The method may include operations 501 and 502.

501: When decoding a point cloud stream including at least two attribute data groups, obtain an attribute prediction relationship mode corresponding to a target attribute data group based on a group identifier of the target attribute data group.

For example, client may decapsulate a media file (for example, a point cloud file) sent by a server, to obtain the point cloud stream including the at least two attribute data groups and decode the point cloud stream. In the decoding process, the attribute data groups included in the point cloud stream may be decoded. The target attribute data group is used as an example. The target attribute data group is a currently decoded attribute data group, and the client may obtain the attribute prediction relationship mode corresponding to the target attribute data group. The target attribute data group is a to-be-decoded attribute data group in the at least two attribute data groups, and the at least two attribute data groups include one or more to-be-referenced attribute data groups that meet the attribute prediction relationship mode with the target attribute data group.

In some embodiments, the attribute prediction relationship mode may include but is not limited to an inter-attribute prediction mode and a default attribute prediction mode. The inter-attribute prediction mode may include but is not limited to a cross-attribute prediction mode, a within-attribute prediction mode, and a general attribute prediction mode. The default attribute prediction mode is an attribute prediction mode enabled by the client and the server by default. The client may decode a parameter set (for example, an order parameter set or an attribute parameter set) associated with the point cloud stream, to obtain the attribute prediction relationship mode corresponding to the target attribute data group. For example, when a mode flag field (including but not limited to a first mode flag field, a second mode flag field, and a third mode flag field) is added to the parameter set, a corresponding attribute prediction relationship mode may be determined by parsing the mode flag field.

In some embodiments, if the attribute prediction relationship mode is the inter-attribute prediction mode, the client may obtain prediction states of the target attribute data group for the one or more to-be-referenced attribute data groups.

In some embodiments, if the attribute prediction relationship mode is the default attribute prediction mode, the client may determine a reference attribute data group corresponding to the target attribute data group in the one or more to-be-referenced attribute data groups. For a process, refer to operation 502 below. The reference attribute data group herein is configured for participating in decoding the target attribute data group or not participating in decoding the target attribute data group.

For example, when the inter-attribute prediction mode includes the cross-attribute prediction mode, a process for the client to obtain the attribute prediction relationship mode corresponding to the target attribute data group may be as follows: If the first mode flag field that carries the group identifier is added to the parameter set associated with the point cloud stream, the attribute prediction relationship mode corresponding to the target attribute data group with the group identifier is the cross-attribute prediction mode. The at least two attribute data groups include one or more to-be-referenced attribute data groups that meet the cross-attribute prediction mode with the target attribute data group, and attribute types corresponding to the one or more to-be-referenced attribute data groups are different from an attribute type corresponding to the target attribute data group. When a field value of the first mode flag field is a first flag value, the prediction states of the target attribute data group for the one or more to-be-referenced attribute data groups are prediction on states. When a field value of the first mode flag field is a second flag value, the prediction states of the target attribute data group for the one or more to-be-referenced attribute data groups are prediction off states.

For example, when the inter-attribute prediction mode includes the within-attribute prediction mode, a process for the client to obtain the attribute prediction relationship mode corresponding to the target attribute data group may be as follows: If the second mode flag field that carries the group identifier is added to the parameter set associated with the point cloud stream, the attribute prediction relationship mode corresponding to the target attribute data group with the group identifier is the within-attribute prediction mode. The at least two attribute data groups include one or more to-be-referenced attribute data groups that meet the within-attribute prediction mode with the target attribute data group, and attribute types corresponding to the one or more to-be-referenced attribute data groups are the same as an attribute type corresponding to the target attribute data group. When a field value of the second mode flag field is a third flag value, the prediction states of the target attribute data group for the one or more to-be-referenced attribute data groups are prediction on states. When a field value of the second mode flag field is a fourth flag value, the prediction states of the target attribute data group for the one or more to-be-referenced attribute data groups are prediction off states.

For example, when the inter-attribute prediction mode includes the general attribute prediction mode, a process for the client to obtain the attribute prediction relationship mode corresponding to the target attribute data group may be as follows: If the third mode flag field that carries the group identifier is added to the parameter set associated with the point cloud stream, the attribute prediction relationship mode corresponding to the target attribute data group with the group identifier is the general attribute prediction mode. The at least two attribute data groups include one or more to-be-referenced attribute data groups that meet the general attribute prediction mode with the target attribute data group, and attribute types corresponding to the one or more to-be-referenced attribute data groups are the same as or different from an attribute type corresponding to the target attribute data group. When a field value of the third mode flag field is a fifth flag value, the prediction states of the target attribute data group for the one or more to-be-referenced attribute data groups are prediction on states. When a field value of the third mode flag field is a sixth flag value, the prediction states of the target attribute data group for the one or more to-be-referenced attribute data groups are prediction off states.

For example, when the inter-attribute prediction mode includes the general attribute prediction mode, a process for the client to obtain the attribute prediction relationship mode corresponding to the target attribute data group may be as follows: If the first mode flag field and the second mode flag field that carry the group identifier are added to the parameter set associated with the point cloud stream, the attribute prediction relationship mode corresponding to the target attribute data group with the group identifier is the general attribute prediction mode. The at least two attribute data groups include one or more to-be-referenced attribute data groups that meet the general attribute prediction mode with the target attribute data group.

In some embodiments, when a field value of the first mode flag field is a first flag value and a field value of the second mode flag field is a third flag value, the prediction states of the target attribute data group for the one or more to-be-referenced attribute data groups are prediction on states, and the attribute types corresponding to the one or more to-be-referenced attribute data groups are the same as or different from the attribute type corresponding to the target attribute data group.

In some embodiments, when a field value of the first mode flag field is a second flag value and a field value of the second mode flag field is a third flag value, the prediction states of the target attribute data group for the one or more to-be-referenced attribute data groups are prediction on states, and the attribute types corresponding to the one or more to-be-referenced attribute data groups are the same as the attribute type corresponding to the target attribute data group.

In some embodiments, when a field value of the first mode flag field is a first flag value and a field value of the second mode flag field is a fourth flag value, the prediction states of the target attribute data group for the one or more to-be-referenced attribute data groups are prediction on states, and the attribute types corresponding to the one or more to-be-referenced attribute data groups are different from the attribute type corresponding to the target attribute data group.

In some embodiments, when a field value of the first mode flag field is a second flag value and a field value of the second mode flag field is a fourth flag value, the prediction states of the target attribute data group for the one or more to-be-referenced attribute data groups are prediction off states, and the attribute types corresponding to the one or more to-be-referenced attribute data groups are the same as or different from the attribute type corresponding to the target attribute data group.

Decoding is reversed to encoding. For the process of this operation, reference may be made to operation 401 and FIG. 4.

502: Determine the reference attribute data group corresponding to the target attribute data group in the one or more to-be-referenced attribute data groups when the prediction states of the target attribute data group for the one or more to-be-referenced attribute data groups are prediction on states.

Based on determining the attribute prediction relationship mode corresponding to the target attribute data group, the client may further determine the reference attribute data group to be referenced for decoding the target attribute data group. In some embodiments, when the prediction states of the target attribute data group for the one or more to-be-referenced attribute data groups are prediction on states, or when the attribute prediction relationship mode corresponding to the target attribute data group is a default attribute prediction mode, the client may determine the reference attribute data group corresponding to the target attribute data group in the corresponding one or more to-be-referenced attribute data groups. The reference attribute data group herein may be configured for participating in decoding the target attribute data group or not participating in decoding the target attribute data group. This is not limited.

Some embodiments may provide a plurality of feasible implementations to determine the reference attribute data group corresponding to the target attribute data group and decode the target attribute data group. For example, the client may determine the reference attribute data group corresponding to the target attribute data group by analyzing parameters such as a reference group identifier, a reference group identifier list, an attribute codec order field, or a mode flag field set by the server in the related parameter set. A reference attribute data group defaulted by the client and the server may be used, to implement prediction between the corresponding attribute data groups and another operation.

For example, in some embodiments, if the reference group identifier is added to attribute header information associated with the point cloud stream, the client may use the to-be-referenced attribute data group with the reference group identifier in the one or more to-be-referenced attribute data groups as the reference attribute data group corresponding to the target attribute data group. The reference group identifier herein may carry the group identifier or may not carry the group identifier. Further, when the target attribute data group is decoded depending on an attribute prediction parameter group, the client may obtain an attribute prediction parameter group corresponding to the target attribute data group, and decode the target attribute data group based on the attribute prediction parameter group and the reference attribute data group indicated by the reference group identifier. A process may be as follows:

In some embodiments, if the target attribute data group is decoded depending on the attribute prediction parameter group, and a value of the group identifier is larger than a value of the reference group identifier, the client may obtain the attribute prediction parameter group that corresponds to the target attribute data group and that is set by the server. The attribute prediction parameter group may include a first attribute prediction weight parameter and a second attribute prediction weight parameter. Further, the target attribute data group may be decoded based on the first attribute prediction weight parameter, the second attribute prediction weight parameter, and the reference attribute data group.

In some embodiments, the client may first obtain the attribute prediction parameter group that corresponds to the target attribute data group and that is set by the server. The attribute prediction parameter group may include a first attribute prediction weight parameter and a second attribute prediction weight parameter. Further, if the target attribute data group is decoded depending on the attribute prediction parameter group, and the value of the group identifier is larger than the value of the reference group identifier, the client may decode the target attribute data group based on the first attribute prediction weight parameter, the second attribute prediction weight parameter, and the reference attribute data group.

In some embodiments, if the value of the group identifier is less than or equal to the value of the reference group identifier, the client may directly decode the target attribute data group.

In some embodiments, the group identifier may include a target attribute type index and a target data group index corresponding to the target attribute data group, and the reference group identifier may include a reference attribute type index and a reference data group index corresponding to the reference attribute data group. In this case, a process of decoding the target attribute data group may be as follows:

In some embodiments, when the target attribute data group is decoded depending on the attribute prediction parameter group, and a value of the reference attribute type index is the same as a value of the target attribute type index, if a value of the target data group index is greater than a value of the reference data group index, the client may obtain the attribute prediction parameter group that corresponds to the target attribute data group and that is set by the server. The attribute prediction parameter group herein may include a first attribute prediction weight parameter and a second attribute prediction weight parameter. Further, the client may decode the target attribute data group based on the first attribute prediction weight parameter, the second attribute prediction weight parameter, and the reference attribute data group.

In some embodiments, when the target attribute data group is decoded depending on the attribute prediction parameter group, a value of the reference attribute type index is different from a value of the target attribute type index, and a codec order of an attribute type indicated by the reference attribute type index is earlier than a codec order of an attribute type indicated by the target attribute type index, the client may obtain the attribute prediction parameter group that corresponds to the target attribute data group and that is set by the server. The attribute prediction parameter group herein may include a first attribute prediction weight parameter and a second attribute prediction weight parameter. Further, the client may decode the target attribute data group based on the first attribute prediction weight parameter, the second attribute prediction weight parameter, and the reference attribute data group.

In some embodiments, if a reference group identifier list is added to the attribute header information associated with the point cloud stream, the client may use a to-be-referenced attribute data group with a reference group identifier included in the reference group identifier list in the one or more to-be-referenced attribute data groups as the reference attribute data group corresponding to the target attribute data group. The reference group identifier list may or may not carry the group identifier. Further, when decoding the target attribute data group depending on an attribute prediction parameter group, the client may obtain an attribute prediction parameter group that is associated with each reference attribute data group and that is set by the server, and decode the target attribute data group based on the set attribute prediction parameter group and the reference attribute data group.

One or more reference attribute data groups corresponding to the reference group identifier list each may be an attribute data group decoded before the target attribute data group, and an attribute type corresponding to each reference attribute data group is the same or different from the attribute type corresponding to the target attribute data group. Each reference attribute data group is an attribute data group of an attribute type that is decoded before the target attribute data group. Each reference attribute data group is a decoded attribute data group of an attribute type.

The attribute prediction parameter group associated with each reference attribute data group may be set independently, or attribute prediction parameter groups associated with reference attribute data groups of a same attribute type are shared, or the attribute prediction parameter group associated with each reference attribute data group is shared.

In some embodiments, if an attribute codec order field that carries the group identifier or an attribute codec order field that does not carry the group identifier is added to the attribute header information associated with the point cloud stream, the client may determine the reference attribute data group corresponding to a target attribute data group in the one or more to-be-referenced attribute data groups based on the attribute codec order field. The attribute codec order field that carries the group identifier may indicate a codec order used by the target attribute data group for an attribute type. The attribute codec order field that does not carry the group identifier indicates a codec order used by the at least two attribute data groups for an attribute type.

It is assumed that a total quantity of attribute types corresponding to the at least two attribute data groups is N, and N is a positive integer. A field value of the attribute codec order field may be an index value corresponding to a codec order in an attribute type codec order table associated with the at least two attribute data groups, and each codec order of attribute types in the attribute type codec order table is a codec order corresponding to the N attribute types, or the attribute codec order field may describe a specified codec order corresponding to the N attribute types.

Based on this, assuming that the attribute type corresponding to the target attribute data group is ordered as N1 in the codec order corresponding to the N attribute types, and N1 is a positive integer less than or equal to N, a process of determining the reference attribute data group by the client based on the attribute codec order field may be as follows:

In some embodiments, according to the codec order corresponding to the N attribute types indicated by the attribute codec order field, the client may use an $N2^{th}$ attribute type before the attribute type corresponding to the target attribute data group as a pre-predicted attribute type, or may use N2 attribute types before the attribute type corresponding to the target attribute data group as pre-predicted attribute types. N2 is a positive integer less than N1. Further, the reference attribute data group corresponding to the target attribute data group may be determined in to-be-referenced attribute data groups of the pre-predicted attribute type included in the one or more to-be-referenced attribute data groups. The reference attribute data group herein may be a default to-be-referenced attribute data group of the pre-predicted attribute type for the server and the client.

In some embodiments, the client may use the attribute type before the attribute type corresponding to the target attribute data group as the pre-predicted attribute type according to the codec order of the attribute type indicated by the attribute codec order field, and may obtain a reference group identifier that carries the group identifier added by the server to the attribute header information associated with the point cloud stream based on the pre-predicted attribute type. The attribute type corresponding to the attribute data group indicated by the reference group identifier belongs to the pre-predicted attribute type. Further, the to-be-referenced attribute data group with the reference group identifier may be used as the reference attribute data group corresponding to the target attribute data group.

In some embodiments, the client and server may also set the default attribute data group as the reference attribute data group corresponding to the target attribute data group. The default attribute data group may be the first attribute data group or all attribute data groups of the attribute type, or a previous attribute data group of the target attribute data group, or the first attribute data group of the at least two attribute data groups. However, the disclosure is not limited thereto.

In some embodiments, the parameter set associated with the point cloud stream includes a mode flag field, and there are two attribute data groups and one to-be-referenced attribute data group. In this case, if a field value of a mode flag field corresponding to the target attribute data group and a field value of a mode flag field corresponding to the to-be-referenced attribute data group are both set to enable flag values, and a codec order of the target attribute data group is later than a codec order of the to-be-referenced attribute data group, the client may use the to-be-referenced attribute data group as the reference attribute data group corresponding to the target attribute data group. If the field value of the mode flag field corresponding to the target attribute data group is set to the enable flag value, and the field value of the mode flag field corresponding to the to-be-referenced attribute data group is set to a disable flag value, the client may use the to-be-referenced attribute data group as the reference attribute data group corresponding to the target attribute data group.

In some embodiments, the target attribute data group corresponds to one reference attribute data group. The parameter set associated with the point cloud stream includes a mode flag field. The quantity of to-be-referenced attribute data groups is M, and M is a positive integer greater than or equal to 2. In this case, if the field value of the mode flag field corresponding to the target attribute data group and field values of the mode flag fields corresponding to the M to-be-referenced attribute data groups are all set to enable flag values, the client may obtain the reference group identifier added by the server to the parameter set and may use a to-be-referenced attribute data group with the reference group identifier in the M to-be-referenced attribute data groups as the reference attribute data group corresponding to the target attribute data group. In this case, a codec order of the reference attribute data group is earlier than a codec order of the target attribute data group. If the field value of the mode flag field corresponding to the target attribute data group is set to the enable flag value, and the field values of the mode flag fields corresponding to the M to-be-referenced attribute data groups are set to disable flag values, the client may obtain the reference group identifier added by the server to the parameter set and may use a to-be-referenced attribute data group with the reference group identifier in the M to-be-referenced attribute data groups as the reference attribute data group corresponding to the target attribute data group. In this case, a codec order of the reference attribute data group is earlier than a codec order of the target attribute data group.

Decoding is reversed to encoding. For the process of the foregoing operation, reference may be made to operation 402 and FIG. 4.

In addition, the attribute header information associated with the point cloud stream includes general attribute parameters, and the general attribute parameters may also be distinguished in some embodiments. Details are as follows:

In some embodiments, if the general attribute parameters do not depend on an attribute type determining condition, the group identifier may identify a general attribute parameter associated with the target attribute data group when the general attribute parameter is irrelevant to an attribute type. The general attribute parameter herein may include a length control parameter, and the length control parameter represents a control zero run length. When the general attribute parameter is associated with the attribute type, an attribute type associated with the general attribute parameter is present, and the attribute type is not identified in a field of the general attribute parameter, the group identifier may identify the general attribute parameter associated with the target attribute data group. The general attribute parameter may include a general attribute encoding order parameter and a general attribute encoding index Golomb number.

If the general attribute parameter depends on the attribute type determining condition, when the general attribute parameter is related to an attribute type, the attribute type related to the general attribute parameter is present, and the attribute type is identified in the field of the general attribute parameter, the group identifier may identify the general attribute parameter associated with the target attribute data group. The general attribute parameter may include a color attribute encoding order parameter corresponding to a color attribute, a color attribute encoding index Golomb number corresponding to the color attribute, a reflectance attribute encoding order parameter corresponding to a reflectance attribute, and a reflectance attribute encoding index Golomb number corresponding to the reflectance attribute. When the general attribute parameter is related to the attribute type, the attribute type related to the general attribute parameter is present, and a same attribute type corresponds to a same general attribute parameter, the general attribute parameter may be identified without carrying the group identifier. The general attribute parameter herein may include a color attribute encoding order parameter corresponding to the color attribute, a color attribute encoding index Golomb number corresponding to the color attribute, a reflectance attribute encoding order parameter corresponding to the reflectance attribute, and a reflectance attribute encoding index Golomb number corresponding to the reflectance attribute.

In addition, the attribute header information associated with the point cloud stream may include the general parameter. A representation form of the general parameter may be an original form or a power exponent form, and the power exponent form herein may include a first power exponent form and a second power exponent form. For example, when the representation form of the general parameter is the original form, a value of the general parameter in the original form is L, and L is a positive integer. When a representation form of a general parameter is the first power exponent form, a value of the general parameter in the first power exponent form is L1, $L=2^{L}$, and L1 is a nonnegative integer less than L. When a representation form of a general parameter is the second power exponent form, a value of the general parameter in the second power exponent form is L2, and $L=2^{L2+L3}$. L2 and L3 are all nonnegative integers less than L, L3 is a fixed constant, and L2+L3=L1.

For the process of distinguishing and identifying the general parameters in this operation, refer to operation 402 and FIG. 4.

As can be learned from the above, in some embodiments, the attribute data groups may be distinguished by a specified identifier (for example, the group identifier corresponding to the target attribute data group), and a prediction reference relationship between the attribute data groups may be further concretized, so that the reference attribute data group that is referenced during attribute decoding can be quickly determined in the corresponding one or more to-be-referenced attribute data groups, to implement attribute prediction between a plurality of attribute data groups, and finally improve decoding efficiency of the multi-attribute point cloud stream. In addition, when decapsulating and decoding the point cloud file, the client may partially transmit or partially decode the point cloud file according to a file encapsulation structure for different point cloud components, to save bandwidth and computing resources.

Figure 6:
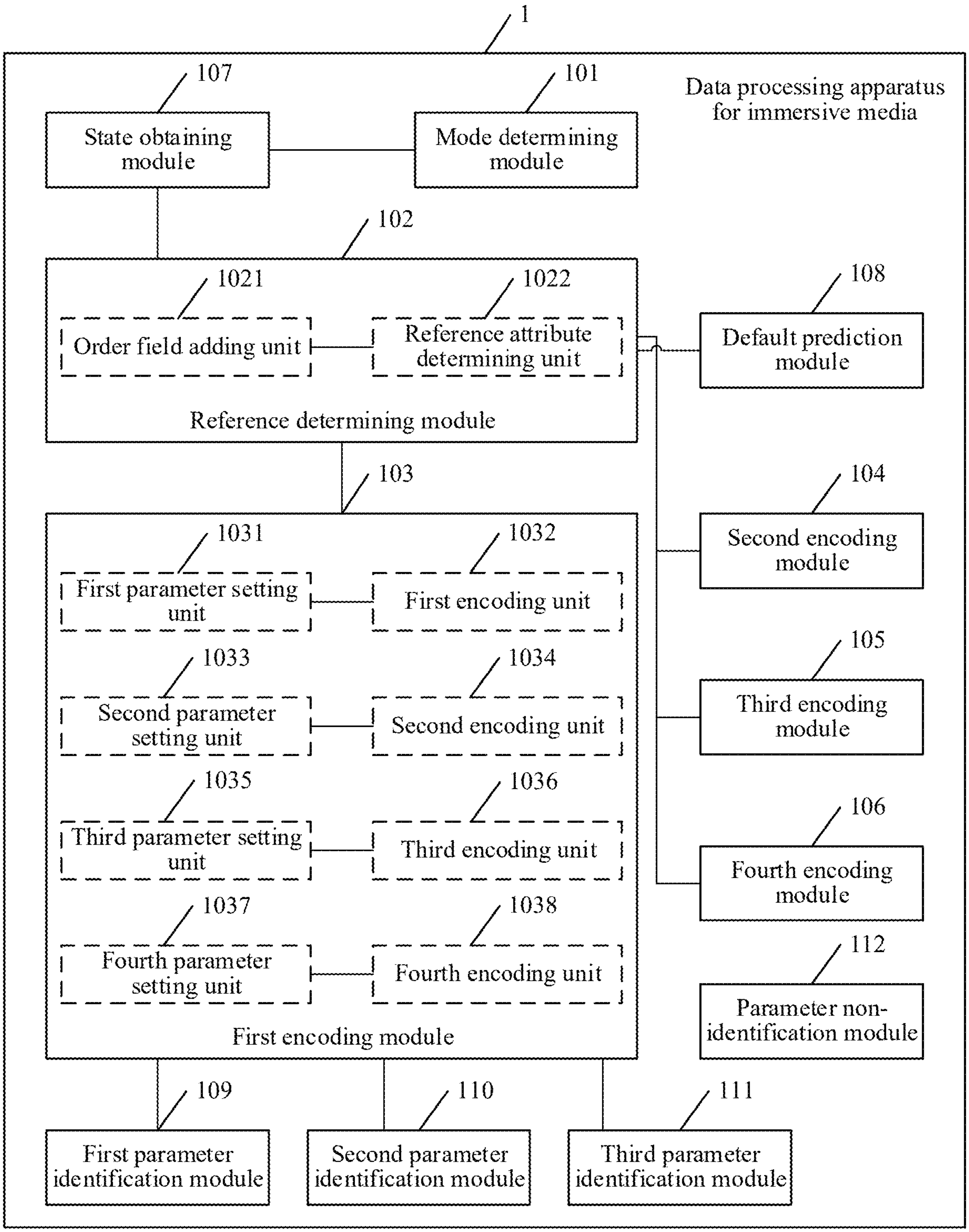
FIG. 6 is a schematic diagram of a structure of a data processing apparatus for immersive media according to some embodiments.

FIG. 6 is a schematic diagram of a structure of a data processing apparatus for immersive media according to some embodiments. The data processing apparatus for immersive media may be a computer program (including program code) running on a content production device, for example, the data processing apparatus for immersive media is application software in the content production device. The apparatus may be configured to perform corresponding operations in the data processing method for immersive media according to some embodiments. As shown in FIG. 6, the data processing apparatus 1 for immersive media may include: a mode determining module 101, a reference determining module 102, a first encoding module 103, a second encoding module 104, a third encoding module 105, a fourth encoding module 106, a state obtaining module 107, a default prediction module 108, first parameter identification module 109, a second parameter identification module 110, a third parameter identification module 111, and a parameter non-identification module 112.

The mode determining module 101 is configured to: during encoding of point cloud data including at least two attribute data groups, determine an attribute prediction relationship mode corresponding to a target attribute data group based on a group identifier of the target attribute data group. The target attribute data group is an attribute data group with the group identifier in the at least two attribute data groups, and the at least two attribute data groups include one or more to-be-referenced attribute data groups that meet the attribute prediction relationship mode with the target attribute data group.

In some embodiments, an inter-attribute prediction mode includes a cross-attribute prediction mode.

The mode determining module 101 is configured to add, to a parameter set associated with the point cloud data, a first mode flag field that carries the group identifier. The first mode flag field indicates that the attribute prediction relationship mode corresponding to the target attribute data group with the group identifier is the cross-attribute prediction mode. The at least two attribute data groups include one or more to-be-referenced attribute data groups that meet the cross-attribute prediction mode with the target attribute data group, and attribute types corresponding to the one or more to-be-referenced attribute data groups are different from an attribute type corresponding to the target attribute data group. When a field value of the first mode flag field is a first flag value, the prediction states of the target attribute data group for the one or more to-be-referenced attribute data groups are prediction on states. When a field value of the first mode flag field is a second flag value, the prediction states of the target attribute data group for the one or more to-be-referenced attribute data groups are prediction off states.

In some embodiments, the inter-attribute prediction mode includes a within-attribute prediction mode.

The mode determining module 101 is configured to add, to the parameter set associated with the point cloud data, a second mode flag field that carries the group identifier. The second mode flag field indicates that the attribute prediction relationship mode corresponding to the target attribute data group with the group identifier is the within-attribute prediction mode. The at least two attribute data groups include one or more to-be-referenced attribute data groups that meet the within-attribute prediction mode with the target attribute data group, and attribute types corresponding to the one or more to-be-referenced attribute data groups are different from the attribute type corresponding to the target attribute data group. When a field value of the second mode flag field is a third flag value, the prediction states of the target attribute data group for the one or more to-be-referenced attribute data groups are prediction on states. When a field value of the second mode flag field is a fourth flag value, the prediction states of the target attribute data group for the one or more to-be-referenced attribute data groups are prediction off states.

In some embodiments, the inter-attribute prediction mode includes a general attribute prediction mode.

The mode determining module 101 is configured to add, to the parameter set associated with the point cloud data, a third mode flag field that carries the group identifier. The third mode flag field indicates that the attribute prediction relationship mode corresponding to the target attribute data group with the group identifier is the general attribute prediction mode. The at least two attribute data groups include one or more to-be-referenced attribute data groups that meet the general attribute prediction mode with the target attribute data group, and attribute types corresponding to the one or more to-be-referenced attribute data groups are the same as or different from the attribute type corresponding to the target attribute data group. When a field value of the third mode flag field is a fifth flag value, the prediction states of the target attribute data group for the one or more to-be-referenced attribute data groups are prediction on states. When a field value of the third mode flag field is a sixth flag value, the prediction states of the target attribute data group for the one or more to-be-referenced attribute data groups are prediction off states.

In some embodiments, the inter-attribute prediction mode includes a general attribute prediction mode.

The mode determining module 101 is configured to add, to the parameter set associated with the point cloud data, a first mode flag field and a second mode flag field that carry the group identifier. The first mode flag field and the second mode flag field jointly indicate that the attribute prediction relationship mode corresponding to the target attribute data group with the group identifier is the general attribute prediction mode. The at least two attribute data groups include one or more to-be-referenced attribute data groups that meet the general attribute prediction mode with the target attribute data group.

When a field value of the first mode flag field is a first flag value and a field value of the second mode flag field is a third flag value, the prediction states of the target attribute data group for the one or more to-be-referenced attribute data groups are prediction on states, and attribute types corresponding to the one or more to-be-referenced attribute data groups are the same as or different from the attribute type corresponding to the target attribute data group.

When a field value of the first mode flag field is a second flag value and a field value of the second mode flag field is a third flag value, the prediction states of the target attribute data group for the one or more to-be-referenced attribute data groups are prediction on states, and attribute types corresponding to the one or more to-be-referenced attribute data groups are the same as the attribute type corresponding to the target attribute data group.

When a field value of the first mode flag field is a first flag value and a field value of the second mode flag field is a fourth flag value, the prediction states of the target attribute data group for the one or more to-be-referenced attribute data groups are prediction on states, and attribute types corresponding to the one or more to-be-referenced attribute data groups are different from the attribute type corresponding to the target attribute data group.

In some embodiments, when a field value of the first mode flag field is a second flag value and a field value of the second mode flag field is a fourth flag value, the prediction states of the target attribute data group for the one or more to-be-referenced attribute data groups are prediction off states, and attribute types corresponding to the one or more to-be-referenced attribute data groups are the same as or different from the attribute type corresponding to the target attribute data group.

The reference determining module 102 is configured to determine a reference attribute data group corresponding to the target attribute data group in the one or more to-be-referenced attribute data groups when prediction states of the target attribute data group for the one or more to-be-referenced attribute data groups are prediction on states, where the reference attribute data group is configured for participating in encoding the target attribute data group or not participating in encoding the target attribute data group.

In some embodiments, when the reference attribute data group corresponding to the target attribute data group is a default attribute data group for a server and a client, the default attribute data group is the first attribute data group of an attribute type or all attribute data groups of the attribute type, or a previous attribute data group of the target attribute data group, or the first attribute data group in the at least two attribute data groups.

In some embodiments, the reference determining module 102 is configured to: if a reference group identifier is added to attribute header information associated with the point cloud data, use an attribute data group with a reference group identifier in the one or more to-be-referenced attribute data groups as the reference attribute data group corresponding to the target attribute data group. The reference group identifier carries the group identifier or does not carry the group identifier.

In some embodiments, a parameter set associated with the point cloud data includes a mode flag field. There are two attribute data groups, and one to-be-referenced attribute data group.

The reference determining module 102 is configured to: if a field value of a mode flag field corresponding to the target attribute data group and a field value of a mode flag field corresponding to the to-be-referenced attribute data group are both set to enable flag values, and a codec order of the target attribute data group is later than a codec order of the to-be-referenced attribute data group, use the to-be-referenced attribute data group as the reference attribute data group corresponding to the target attribute data group; or if the field value of the mode flag field corresponding to the target attribute data group is set to the enable flag value, and the field value of the mode flag field corresponding to the to-be-referenced attribute data group is set to a disable flag value, use the to-be-referenced attribute data group as the reference attribute data group corresponding to the target attribute data group.

In some embodiments, the target attribute data group corresponds to one reference attribute data group. The parameter set associated with the point cloud data includes a mode flag field. There are M to-be-referenced attribute data groups, and M is a positive integer greater than or equal to 2.

The reference determining module 102 is configured to: if a field value of a mode flag field corresponding to the target attribute data group and field values of mode flag fields corresponding to the M to-be-referenced attribute data groups are set to enable flag values, add a reference group identifier to the parameter set, and use a to-be-referenced attribute data group with the reference group identifier in the M to-be-referenced attribute data groups as the reference attribute data group corresponding to the target attribute data group, where a codec order of the reference attribute data group is earlier than a codec order of the target attribute data group; or if the field value of the mode flag field corresponding to the target attribute data group is set to the enable flag value, and the field values of the mode flag fields corresponding to the M to-be-referenced attribute data groups are set to disable flag values, add a reference group identifier to the parameter set, and use a to-be-referenced attribute data group with the reference group identifier in the M to-be-referenced attribute data groups as the reference attribute data group corresponding to the target attribute data group, where the codec order of the reference attribute data group is earlier than a codec order of the target attribute data group.

In some embodiments, the reference determining module 102 is configured to: if a reference group identifier list is added to attribute header information associated with the point cloud data, use a to-be-referenced attribute data group with a reference group identifier included in the reference group identifier list in the one or more to-be-referenced attribute data groups as the reference attribute data group corresponding to the target attribute data group. The reference group identifier list carries the group identifier or does not carry the group identifier.

The first determining module 102 may include an order field adding unit 1021, and a reference attribute determining unit 1022.

The order field adding unit 1021 is configured to add, to the attribute header information associated with the point cloud data, an attribute codec order field that carries the group identifier or an attribute codec order field that does not carry the group identifier. The attribute codec order field that carries the group identifier indicates a codec order used by the target attribute data group for an attribute type. The attribute codec order field that does not carry the group identifier indicates a codec order used by the at least two attribute data groups for an attribute type.

The reference attribute determining unit 1022 is configured to determine the reference attribute data group corresponding to the target attribute data group in the one or more to-be-referenced attribute data groups based on the attribute codec order field.

In some embodiments, a total quantity of attribute types corresponding to the at least two attribute data groups is N, and N is a positive integer. A field value of the attribute codec order field is an index value corresponding to a codec order in an attribute type codec order table associated with the at least two attribute data groups, and each codec order of attribute types in the attribute type codec order table is a codec order corresponding to the N attribute types, or the attribute codec order field may describe a specified codec order corresponding to the N attribute types.

The attribute type corresponding to the target attribute data group is ordered as N1 in a codec order corresponding to the N attribute types, and N1 is a positive integer less than or equal to N.

The reference attribute determining unit 1022 is configured to: according to the codec order corresponding to the N attribute types indicated by the attribute codec order field, use an $N2^{th}$ attribute type before the attribute type corresponding to the target attribute data group as a pre-predicted attribute type, or use N2 attribute types before the attribute type corresponding to the target attribute data group as pre-predicted attribute types, where N2 is a positive integer less than N1; and determine the reference attribute data group corresponding to the target attribute data group in to-be-referenced attribute data groups of the pre-predicted attribute type included in the one or more to-be-referenced attribute data groups. The reference attribute data group is a default to-be-referenced attribute data group of the pre-predicted attribute type for the server and the client.

In some embodiments, the reference attribute determining unit 1022 is configured to: according to the codec order of the attribute type indicated by the attribute codec order field, use an attribute type before the attribute type corresponding to the target attribute data group as a pre-predicted attribute type; add, based on the pre-predicted attribute type to the attribute header information associated with the point cloud data, a reference group identifier that carries the group identifier, where the attribute type corresponding to the attribute data group indicated by the reference group identifier belongs the pre-predicted attribute type; and using a to-be-referenced attribute data group with the reference group identifier as the reference attribute data group corresponding to the target attribute data group.

For implementation details of the order field adding unit 1021 and the reference attribute determining unit 1022, refer to operation 402 and FIG. 4.

The first encoding module 103 is configured to: when the target attribute data group is encoded depending on an attribute prediction parameter group, encode the target attribute data group based on the attribute prediction parameter group and the reference attribute data group indicated by the reference group identifier.

The first encoding module 103 may include a first parameter setting unit 1031, a first encoding unit 1032, a second parameter setting unit 1033, a second encoding unit 1034, a third parameter setting unit 1035, a third encoding unit 1036, a fourth parameter setting unit 1037, and a fourth encoding unit 1038.

The first parameter setting unit 1031 is configured to: if the target attribute data group is encoded depending on the attribute prediction parameter group and a value of the group identifier is larger than a value of the reference group identifier, set the attribute prediction parameter group corresponding to the target attribute data group. The attribute prediction parameter group includes a first attribute prediction weight parameter and a second attribute prediction weight parameter.

The first encoding unit 1032 is configured to encode the target attribute data group based on the first attribute prediction weight parameter, the second attribute prediction weight parameter, and the reference attribute data group.

The second parameter setting unit 1033 is configured to set an attribute prediction parameter group corresponding to the target attribute data group. The attribute prediction parameter group includes a first attribute prediction weight parameter and a second attribute prediction weight parameter.

The second encoding unit 1034 is configured to: if the target attribute data group is decoded depending on the attribute prediction parameter group, and a value of the group identifier is larger than a value of the reference group identifier, encode the target attribute data group based on the first attribute prediction weight parameter, the second attribute prediction weight parameter, and the reference attribute data group.

In some embodiments, the group identifier includes a target attribute type index and a target data group index corresponding to the target attribute data group, and the reference group identifier includes a reference attribute type index and a reference data group index corresponding to the reference attribute data group.

The third parameter setting unit 1035 is configured to: when the target attribute data group is encoded depending on the attribute prediction parameter group and a value of the reference attribute type index is the same as a value of the target attribute type index, if a value of the target data group index is larger than a value of the reference data group index, set the attribute prediction parameter group corresponding to the target attribute data group. The attribute prediction parameter group includes a first attribute prediction weight parameter and a second attribute prediction weight parameter.

The third encoding unit 1036 is configured to encode the target attribute data group based on the first attribute prediction weight parameter, the second attribute prediction weight parameter, and the reference attribute data group.

The fourth parameter setting unit 1037 is configured to: when the target attribute data group is encoded depending on the attribute prediction parameter group, a value of the reference attribute type index is different from a value of the target attribute type index, and a codec order of an attribute type indicated by the reference attribute type index is earlier than a codec order of an attribute type indicated by the target attribute type index, set the attribute prediction parameter group corresponding to the target attribute data group. The attribute prediction parameter group includes a first attribute prediction weight parameter and a second attribute prediction weight parameter.

The fourth encoding unit 1038 is configured to encode the target attribute data group based on the first attribute prediction weight parameter, the second attribute prediction weight parameter, and the reference attribute data group.

For implementation details of the first parameter setting unit 1031, the first encoding unit 1032, the second parameter setting unit 1033, the second encoding unit 1034, the third parameter setting unit 1035, the third encoding unit 1036, the fourth parameter setting unit 1037, and the fourth encoding unit 1038, refer to operation 402 and FIG. 4.

The second encoding module 104 is configured to encode the target attribute data group when the target attribute data group is encoded independently of the attribute prediction parameter group.

The third encoding module 105 is configured to encode the target attribute data group if the value of the group identifier is less than or equal to the value of the reference group identifier.

The fourth encoding module 106 is configured to: when the target attribute data group is encoded depending on the attribute prediction parameter group, set an attribute prediction parameter group associated with each reference attribute data group, and encode the target attribute data group based on the set attribute prediction parameter group and the reference attribute data group.

In some embodiments, the reference attribute data group is an attribute data group encoded before the target attribute data group, and an attribute type corresponding to each reference attribute data group is the same or different from the attribute type corresponding to the target attribute data group. The reference attribute data group is an attribute data group of an attribute type that is encoded before the target attribute data group. The reference attribute data group is an encoded attribute data group of an attribute type.

In some embodiments, the attribute prediction parameter group associated with each reference attribute data group is set independently, or attribute prediction parameter groups associated with reference attribute data groups of a same attribute type are shared, or the attribute prediction parameter group associated with each reference attribute data group is shared.

The state obtaining module 107 is configured to: if the attribute prediction relationship mode is an inter-attribute prediction mode, obtain the prediction states of the target attribute data group for the one or more to-be-referenced attribute data groups.

The default prediction module 108 is configured to: if the attribute prediction relationship mode is a default attribute prediction mode, determine the reference attribute data group corresponding to the target attribute data group in one or a plurality of to-be-referenced attribute data groups, where the reference attribute data group is configured for participating in decoding the target attribute data group or not participating in decoding the target attribute data group.

In some embodiments, attribute header information associated with the point cloud data includes a general attribute parameter, and the general attribute parameter does not depend on an attribute type determining condition.

The first parameter identification module 109 is configured to: when the general attribute parameter is not related to an attribute type, add a group identifier, to identify a general attribute parameter associated with the target attribute data group. The general attribute parameter includes a length control parameter, and the length control parameter represents a control zero run length.

The second parameter identification module 110 is configured to: when the general attribute parameter is associated with an attribute type, the attribute type associated with the general attribute parameter is present, and the attribute type is not identified in a field of the general attribute parameter, add a group identifier to identify the general attribute parameter associated with the target attribute data group. The general attribute parameter includes a general attribute encoding order parameter and a general attribute encoding index Golomb number.

In some embodiments, attribute header information associated with the point cloud data includes a general attribute parameter, and the general attribute parameter depends on an attribute type determining condition.

The third parameter identification module 111 is configured to: when the general attribute parameter is associated with an attribute type, the attribute type associated with the general attribute parameter is present, and the attribute type is identified in a field of the general attribute parameter, add a group identifier to identify the general attribute parameter associated with the target attribute data group. The general attribute parameter may include a color attribute encoding order parameter corresponding to a color attribute, a color attribute encoding index Golomb number corresponding to the color attribute, a reflectance attribute encoding order parameter corresponding to a reflectance attribute, and a reflectance attribute encoding index Golomb number corresponding to the reflectance attribute.

The parameter non-identification module 112 is configured to: when the general attribute parameter is related to the attribute type, the attribute type related to the general attribute parameter is present, and a same attribute type corresponds to a same general attribute parameter, skip identifying the general attribute parameter. The general attribute parameter may include a color attribute encoding order parameter corresponding to a color attribute, a color attribute encoding index Golomb number corresponding to the color attribute, a reflectance attribute encoding order parameter corresponding to a reflectance attribute, and a reflectance attribute encoding index Golomb number corresponding to the reflectance attribute.

In some embodiments, the parameter set associated with the point cloud data includes a general parameter. A representation form of the general parameter is an original form or a power exponent form. The power exponent form includes a first power exponent form and a second power exponent form.

When the representation form of the general parameter is the original form, a value of the general parameter in the original form is L, and L is a positive integer.

When the representation form of the general parameter is the first power exponent form, a value of the general parameter in the first power exponent form is L1, and $L=2^{L1}$. L1 is a nonnegative integer less than L.

When the representation form of the general parameter is the second power exponent form, a value of the general parameter in the second power exponent form is L2, and $L=2^{L2+L3}$. L2 and L3 are all nonnegative integers less than L, L3 is a fixed constant, and L2+L3=L1.

For implementation details of the mode determining module 101, the reference determining module 102, the first encoding module 103, the second encoding module 104, the third encoding module 105, the fourth encoding module 106, the state obtaining module 107, the default prediction module 108, the first parameter identification module 109, the second parameter identification module 110, the third parameter identification module 111, and the parameter non-identification module 112, refer to operations 401 and 402 in FIG. 4.

Figure 7:
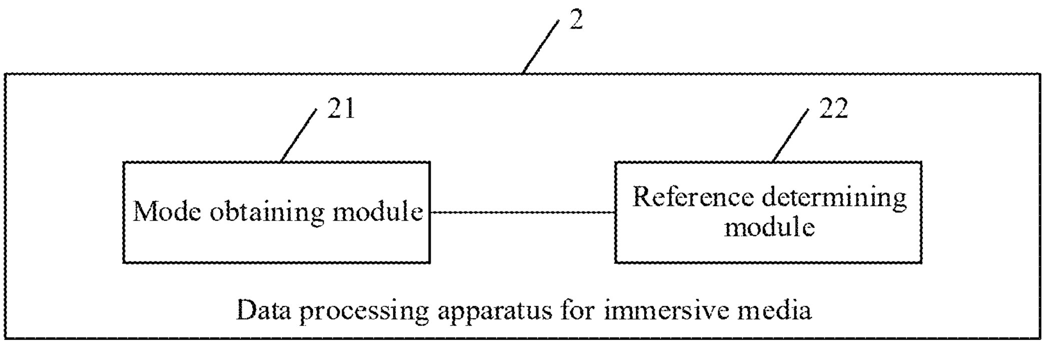
FIG. 7 is a schematic diagram of a structure of a data processing apparatus for immersive media according to some embodiments.

FIG. 7 is a schematic diagram of a structure of a data processing apparatus for immersive media according to some embodiments. The data processing apparatus for immersive media may be a computer program (including program code) running on a content consumption device. For example, the data processing apparatus for immersive media is application software (for example, a video client) in the content consumption device. The apparatus may be configured to perform corresponding operations in the data processing method for immersive media according to some embodiments. As shown in FIG. 7, the data processing apparatus 2 for immersive media may include a mode obtaining module 21 and a reference determining module 22.

The mode obtaining module 21 is configured to: during decoding of a point cloud stream including at least two attribute data groups, obtain an attribute prediction relationship mode corresponding to a target attribute data group based on a group identifier of the target attribute data group. The target attribute data group is an attribute data group with the group identifier in the at least two attribute data groups. The at least two attribute data groups include one or more to-be-referenced attribute data groups that meet the attribute prediction relationship mode with the target attribute data group.

The reference determining module 22 is configured to determine a reference attribute data group corresponding to the target attribute data group in the one or more to-be-referenced attribute data groups when prediction states of the target attribute data group for the one or more to-be-referenced attribute data groups are prediction on states. The reference attribute data group is configured for participating in decoding the target attribute data group or not participating in decoding the target attribute data group.

For implementation details of the mode obtaining module 21 and the reference determining module 22, refer to operations 501 and 502 in FIG. 5.

According to some embodiments, each module or unit may exist respectively or be combined into one or more units. Some units may be further split into multiple smaller function subunits, thereby implementing the same operations without affecting the technical effects of some embodiments. The units are divided based on logical functions. In actual applications, a function of one unit may be realized by multiple units, or functions of multiple units may be realized by one unit. In some embodiments, the apparatus may further include other units. In actual applications, these functions may also be realized cooperatively by the other units, and may be realized cooperatively by multiple units.

A person skilled in the art would understand that these "modules" or "units" could be implemented by hardware logic, a processor or processors executing computer software code, or a combination of both. The "modules" or "units" may also be implemented in software stored in a memory of a computer or a non-transitory computer-readable medium, where the instructions of each unit are executable by a processor to thereby cause the processor to perform the respective operations of the corresponding unit.

Figure 8:
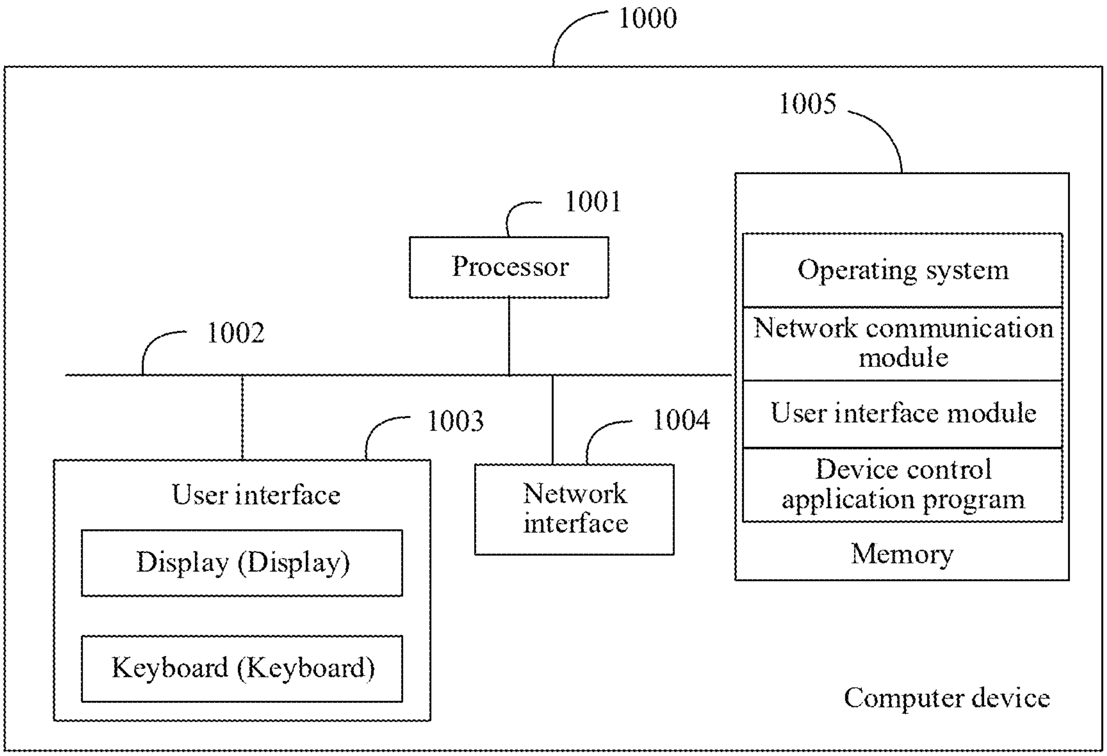
FIG. 8 is a schematic diagram of a structure of a computer device according to some embodiments.

FIG. 8 is a schematic diagram of a structure of a computer device according to some embodiments. As shown in FIG. 8, the computer device 1000 may include: a processor 1001, a network interface 1004, and a memory 1005. In addition, the computer device 1000 may further include a user interface 1003, and at least one communication bus 1002. The communications bus 1002 is configured to implement connection and communication between these components. The user interface 1003 may include a display (Display) and a keyboard (Keyboard). In some embodiments, the user interface 1003 may further include a standard wired interface and wireless interface. In some embodiments, the network interface 1004 may include a standard wired interface and wireless interface (for example, a Wi-Fi interface). The memory 1005 may be a high-speed RAM memory, or may be a non-volatile memory (non-volatile memory), for example, at least one magnetic disk memory. In some embodiments, the memory 1005 may be at least one storage apparatus that is located far away from the foregoing processor 1001. As shown in FIG. 8, the memory 1005 used as a computer storage medium may include an operating system, a network communication module, a user interface module, and a device-control application program.

In the computer device 1000 shown in FIG. 8 the network interface 1004 may provide a network communication function. The user interface 1003 is may be configured to provide an input interface for a user. The processor 1001 may be configured to invoke the device-control application program stored in the memory 1005, to perform the description of the data processing method for immersive media in some embodiments according to FIG. 4 and FIG. 5.

Some embodiments provide a computer-readable storage medium. The computer-readable storage medium stores the computer program executed by the data processing device 1 for immersive media and the data processing device 2 for immersive media described above, and the computer program includes program instructions. When a processor executes the program instructions, the processor can execute the description of the data processing method for immersive media in some embodiments according to FIG. 4 and FIG. 5. Reference may also be made to the descriptions of the method according to some embodiments.

The computer-readable storage medium may be an internal storage unit of the data processing apparatus for immersive media or the computer device provided in some embodiments, for example, a hard disk or a memory of the computer device. The computer-readable storage medium may be an external storage device of the computer device, for example, a plug-in hard disk, a smart media card (SMC), a secure digital (SD) card, a flash card (flash card), or the like provided on the computer device. Further, the computer-readable storage medium may also include both the internal storage unit of the computer device and the external storage device. The computer-readable storage medium is configured to store the computer program and other programs and data for the computer device. The computer-readable storage medium may be further configured to temporarily store data that has been outputted or is to be outputted.

Some embodiments provide a computer program product including a computer program. When the computer program product runs on a computer, the computer device is enabled to perform the method provided in some embodiments according to FIG. 4 and FIG. 5. Reference may also be made to the descriptions of the method according to some embodiments.

Figure 9:
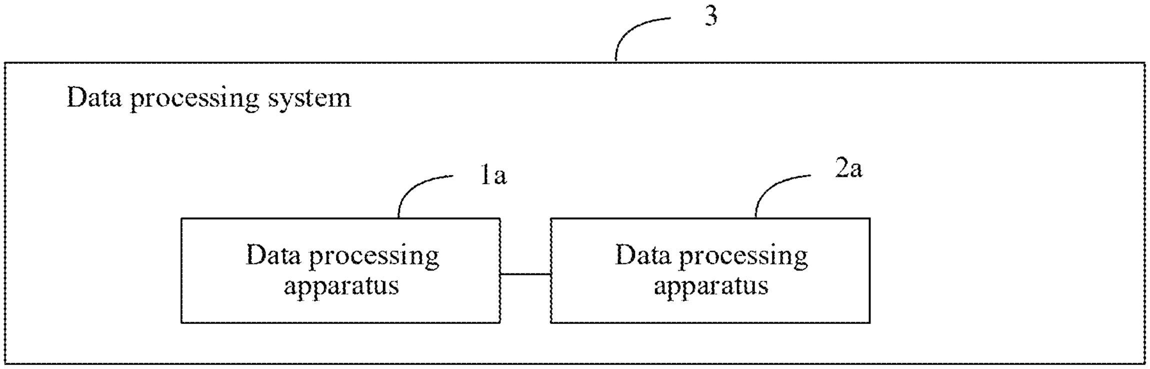
FIG. 9 is a schematic diagram of a structure of a data processing system according to some embodiments.

Further, FIG. 9 is a schematic diagram of a structure of a data processing system according to some embodiments. The data processing system 3 may include a data processing apparatus 1*a* and a data processing apparatus 2*a*. The data processing apparatus 1*a* may be the data processing apparatus 1 for immersive media in some embodiments according to FIG. 6, and the data processing apparatus 1*a* may be integrated into the content production device 100A in some embodiments according to FIG. 3. The data processing apparatus 2*a* may be the data processing apparatus 2 for immersive media in some embodiments according to FIG. 7, and the data processing apparatus 2*a* may be integrated into the content consumption device 100B in some embodiments according to FIG. 3. Reference may also be made to the descriptions of the method according to some embodiments.

The terms "first", "second", and the like, are used to distinguish between different objects, but are not used to describe a specific sequence. In addition, the terms "include" or any other variant thereof, are intended to cover a non-exclusive inclusion. For example, a process, method, apparatus, product, or device that includes a series of operations or modules is not limited to the listed operations or units; and instead, further includes an operation or module that is not listed, or further includes another operation or unit that is intrinsic to the process, method, apparatus, product, or device.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A data processing method for immersive media, performed by a content consumption device, comprising:
- acquiring a point cloud stream comprising a plurality of attribute data groups, the plurality of attribute data groups comprising:
  - a target attribute data group that is a to-be-decoded attribute data group, and
  - one or more to-be-referenced attribute data groups that relate to the target attribute data group based on an attribute prediction relationship mode;
- obtaining the attribute prediction relationship mode based on a group identifier of the target attribute data group;
- determining a reference attribute data group among the one or more to-be-referenced attribute data groups based on one or more prediction states,
  - wherein the reference attribute data group corresponds to the target attribute data group; and
- decoding the target attribute data group,
  - wherein the decoding the target attribute data group includes participation from the reference attribute data group in a first configuration, and
  - the decoding the target attribute data group does not include participation from the reference attribute data group in a second configuration.

2. The method according to claim 1, wherein the determining the reference attribute data group comprises:
- based on a reference group identifier being added to attribute header information associated with the point cloud stream, using a to-be-referenced attribute data group with the reference group identifier in the one or more to-be-referenced attribute data groups as the reference attribute data group corresponding to the target attribute data group,
- wherein the reference group identifier includes a group identifier or does not include the group identifier, and
- wherein the target attribute data group depends on an attribute prediction parameter group, and
- wherein the decoding the target attribute data group comprises:
  - obtaining an attribute prediction parameter group; and
  - decoding the target attribute data group based on the attribute prediction parameter group and the reference attribute data group.

3. The method according to claim 2, wherein the decoding the target attribute data group with participation from the reference attribute data group comprises:
- obtaining a first attribute prediction parameter group comprising a first attribute prediction weight parameter and a second attribute prediction weight parameter, the first attribute prediction parameter group corresponding to the target attribute data group and set by a server based on:
  - the target attribute data group being decoded based on the attribute prediction parameter group, and
  - a first value of the group identifier being larger than a second value of the reference group identifier; and
- decoding the target attribute data group based on the first attribute prediction weight parameter, the second attribute prediction weight parameter, and the reference attribute data group.

4. The method according to claim 2, wherein the decoding the target attribute data group comprises:
- obtaining a first attribute prediction parameter group comprising a first attribute prediction weight parameter and a second attribute prediction weight parameter, that corresponds to the target attribute data group, and that is set by a server; and
- based on the target attribute data group being decoded based on the first attribute prediction parameter group, and a first value of the group identifier being larger than a second value of the reference group identifier, decoding the target attribute data group based on the first attribute prediction weight parameter, the second attribute prediction weight parameter, and the reference attribute data group.

5. The method according to claim 3, further comprising:
- based on the first value being less than or equal to the second value, decoding the target attribute data group.

6. The method according to claim 2, wherein the group identifier comprises a target attribute type index and a target data group index corresponding to the target attribute data group, and
- wherein the reference group identifier comprises a reference attribute type index and a reference data group index corresponding to the reference attribute data group.

7. The method according to claim 6, wherein the decoding the target attribute data group comprises:

obtaining a first attribute prediction parameter group comprising a first attribute prediction weight parameter and a second attribute prediction weight parameter, the first attribute prediction parameter group corresponding to the target attribute data group and is set by a server based on:

the target attribute data group being decoded depending on the attribute prediction parameter group, and a first value of the reference attribute type index being the same as a second value of the target attribute type index, and a third value of the target data group index being greater than a fourth value of the reference data group index; and decoding the target attribute data group based on the first attribute prediction weight parameter, the second attribute prediction weight parameter, and the reference attribute data group.

8. The method according to claim 6, wherein the decoding the target attribute data group comprises:

obtaining a first attribute prediction parameter group comprising a first attribute prediction weight parameter and a second attribute prediction weight parameter, the first attribute prediction parameter group corresponding to the target attribute data group and set by a server based on:

the target attribute data group being decoded based on the attribute prediction parameter group, a fifth value of the reference attribute type index being different from a sixth value of the target attribute type index, and a first codec order of a first attribute type indicated by the reference attribute type index being earlier than a second codec order of a second attribute type indicated by the target attribute type index; and decoding the target attribute data group based on the first attribute prediction weight parameter, the second attribute prediction weight parameter, and the reference attribute data group.

9. The method according to claim 1, wherein a reference group identifier list includes the group identifier or does not include the group identifier, wherein the determining the reference attribute data group comprises based on the reference group identifier list being added to attribute header information associated with the point cloud stream, using a to-be-referenced attribute data group with a reference group identifier in the reference group identifier list as the reference attribute data group, and wherein the decoding the target attribute data group comprises:

based on the target attribute data group being decoded based on an attribute prediction parameter group, obtaining a first attribute prediction parameter group that is associated with each of a plurality of reference attribute data groups and is set by a server; and decoding the target attribute data group based on the first attribute prediction parameter group and the reference attribute data group.

10. The method according to claim 9, wherein, the plurality of reference attribute data groups are decoded before the target attribute data group, the plurality of reference attribute data groups are attribute data groups of attribute types decoded before a plurality of target attribute data groups, or the plurality of reference attribute data groups are decoded attribute data groups of attribute types.

11. A data processing apparatus for immersive media, comprising:

at least one memory configured to store computer program code; and at least one processor configured to read the program code and operate as instructed by the program code, the program code comprising:

acquiring code configured to cause at least one of the at least one processor to acquire a point cloud stream comprising a plurality of attribute data groups, the plurality of attribute data groups comprising:

a target attribute data group that is a to-be-decoded attribute data group, and one or more to-be-referenced attribute data groups that relate to the target attribute data group based on an attribute prediction relationship mode;

mode obtaining code configured to cause at least one of the at least one processor to: obtain the attribute prediction relationship mode based on a group identifier of the target attribute data group;

reference determining code configured to cause at least one of the at least one processor to determine a reference attribute data group among the one or more to-be-referenced attribute data groups based on one or more prediction states, wherein the reference attribute data group corresponds to the target attribute data group; and first decoding code configured to cause at least one of the at least one processor to decode the target attribute data group, wherein the target attribute data group is decoded with participation from the reference data group in a first configuration, and the target attribute data group is decoded without participation from the reference group in a second configuration.

12. The apparatus according to claim 11, wherein the reference determining code is configured to cause at least one of the at least one processor to:

based on a reference group identifier being added to attribute header information associated with the point cloud stream, use a to-be-referenced attribute data group with the reference group identifier in the one or more to-be-referenced attribute data groups as the reference attribute data group corresponding to the target attribute data group, wherein the reference group identifier includes the group identifier or does not include the group identifier, wherein the target attribute data group depends on an attribute prediction parameter group, and wherein the first decoding code is configured to cause at least one of the at least one processor to:

obtain the attribute prediction parameter group; and decode the target attribute data group based on the attribute prediction parameter group and the reference attribute data group.

13. The apparatus according to claim 12, wherein the first decoding code is configured to cause at least one of the at least one processor to:

obtain a first attribute prediction parameter group comprising a first attribute prediction weight parameter and a second attribute prediction weight parameter, the first attribute prediction parameter group corresponding to the target attribute data group and set by a server based on:

the target attribute data group being decoded based on the attribute prediction parameter group, and a first value of the group identifier being larger than a second value of the reference group identifier; and decode the target attribute data group based on the first attribute prediction weight parameter, the second attribute prediction weight parameter, and the reference attribute data group.

14. The apparatus according to claim 12, wherein the first decoding code is configured to cause at least one of the at least one processor to:

obtain a first attribute prediction parameter group comprising a first attribute prediction weight parameter and a second attribute prediction weight parameter, the first attribute prediction parameter group corresponding to the target attribute data group, and set by a server; and based on the target attribute data group being decoded based on the first attribute prediction parameter group, and a first value of the group identifier being larger than a second value of the reference group identifier, decode the target attribute data group based on the first attribute prediction weight parameter, the second attribute prediction weight parameter, and the reference attribute data group.

15. The apparatus according to claim 13, further comprising second decoding code configured to cause at least one of the at least one processor to, based on the first value being less than or equal to the second value, decoding the target attribute data group.

16. The apparatus according to claim 12, wherein the group identifier comprises a target attribute type index and a target data group index corresponding to the target attribute data group, and wherein the reference group identifier comprises a reference attribute type index and a reference data group index corresponding to the reference attribute data group.

17. The apparatus according to claim 16, wherein the first decoding code is configured to cause at least one of the at least one processor to:

obtain a first attribute prediction parameter group comprising a first attribute prediction weight parameter and a second attribute prediction weight parameter, the first attribute prediction parameter group corresponding to the target attribute data group and set by a server based on:

the target attribute data group being decoded depending on the attribute prediction parameter group, and a first value of the reference attribute type index being the same as a second value of the target attribute type index, and a third value of the target data group index being greater than a fourth value of the reference data group index; and decode the target attribute data group based on the first attribute prediction weight parameter, the second attribute prediction weight parameter, and the reference attribute data group.

18. The apparatus according to claim 16, wherein the first decoding code is configured to cause at least one of the at least one processor to:

obtain a first attribute prediction parameter group comprising a first attribute prediction weight parameter and a second attribute prediction weight parameter, the first attribute prediction parameter group corresponding to the target attribute data group set by a server based on:

the target attribute data group being decoded based on the attribute prediction parameter group, a fifth value of the reference attribute type index being different from a sixth value of the target attribute type index, and a first codec order of a first attribute type indicated by the reference attribute type index being earlier than a second codec order of a second attribute type indicated by the target attribute type index; and decode the target attribute data group based on the first attribute prediction weight parameter, the second attribute prediction weight parameter, and the reference attribute data group.

19. The apparatus according to claim 11, wherein a reference group identifier list includes the group identifier or does not include the group identifier, wherein the reference determining code is configured to cause at least one of the at least one processor to, based on the reference group identifier list being added to attribute header information associated with the point cloud stream, use a to-be-referenced attribute data group with a reference group identifier in the reference group identifier list as the reference attribute data group, and wherein the decoding the target attribute data group comprises:

based on the target attribute data group being decoded based on an attribute prediction parameter group, obtain a first attribute prediction parameter group that is associated with each of a plurality of reference attribute data groups and is set by a server; and decode the target attribute data group based on the first attribute prediction parameter group and the reference attribute data group.

20. A non-transitory computer-readable storage medium, storing computer code which, when executed by at least one processor, causes the at least one processor to at least:

acquire a point cloud stream comprising a plurality of attribute data groups, the plurality of attribute data groups comprising:

a target attribute data group that is a to-be-decoded attribute data group, and one or more to-be-referenced attribute data groups that relate to the target attribute data group based on an attribute prediction relationship mode;

obtain the attribute prediction relationship mode based on a group identifier of the target attribute data group;

determine a reference attribute data group among the one or more to-be-referenced attribute data groups based on one or more prediction states, wherein the reference attribute data group corresponds to the target attribute data group; and decode the target attribute data group, wherein the decoding the target attribute data group is decoded with participation from the reference data group in a first configuration, and the target attribute data group is decoded without participation from the reference group in a second configuration.

* * * * *